(12) United States Patent
Tran et al.

(10) Patent No.: US 12,236,512 B2
(45) Date of Patent: Feb. 25, 2025

(54) AVATAR CALL ON AN EYEWEAR DEVICE

(71) Applicant: Snap Inc., Santa Monica, CA (US)

(72) Inventors: Lien Le Hong Tran, Santa Monica, CA (US); Matthew Saunders, Toronto (CA); Daria Skrypnyk, Kyiv (UA); Ilteris Kaan Canberk, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/893,696

(22) Filed: Aug. 23, 2022

(65) Prior Publication Data

US 2024/0070950 A1    Feb. 29, 2024

(51) Int. Cl.
| | |
|---|---|
| *G06T 19/00* | (2011.01) |
| *G06F 3/01* | (2006.01) |
| *G06F 3/0346* | (2013.01) |
| *G06T 13/40* | (2011.01) |
| *G10L 25/78* | (2013.01) |
| *H04L 65/1069* | (2022.01) |

(52) U.S. Cl.
CPC .............. *G06T 13/40* (2013.01); *G06F 3/012* (2013.01); *G06F 3/0346* (2013.01); *G06T 19/006* (2013.01); *G10L 25/78* (2013.01); *H04L 65/1069* (2013.01); *G06T 2210/12* (2013.01); *G06T 2219/024* (2013.01)

(58) Field of Classification Search
CPC . G06T 13/40; G06T 19/006; G06T 2219/024; G06F 3/012; G06F 3/0346; H04N 7/157
See application file for complete search history.

(56) References Cited

U.S. PATENT DOCUMENTS

| | | | |
|---|---|---|---|
| 5,604,843 A | 2/1997 | Shaw et al. | |
| 5,689,559 A | 11/1997 | Park | |
| 5,880,731 A | 3/1999 | Liles et al. | |
| 6,023,270 A | 2/2000 | Brush, II et al. | |

(Continued)

FOREIGN PATENT DOCUMENTS

| | | |
|---|---|---|
| CN | 103049761 B | 8/2016 |
| CN | 109863532 | 6/2019 |

(Continued)

OTHER PUBLICATIONS

"U.S. Appl. No. 17/248,981, Non Final Office Action mailed Sep. 30, 2021", 30 pgs.

(Continued)

*Primary Examiner* — Antonio A Caschera
(74) *Attorney, Agent, or Firm* — Schwegman Lundberg & Woessner, P.A.

(57) ABSTRACT

The disclosed system establishes, by a first augmented reality (AR) device, a voice communication session between a plurality of users. The system displays, by the first AR device of a first user of the plurality of users, an avatar representing a second user of the plurality of users. The system receives, by the first AR device of a first user of the plurality of users, input from the first user that selects a display position for the avatar representing the second user within a real-world environment of the first user. The system animates the avatar representing the second user based on movement information received from a second AR device of the second user.

19 Claims, 11 Drawing Sheets

(56) References Cited

U.S. PATENT DOCUMENTS

| | | | |
|---|---|---|---|
| RE36,919 E | 10/2000 | Park | |
| RE37,052 E | 2/2001 | Park | |
| 6,223,165 B1 | 4/2001 | Lauffer | |
| 6,650,793 B1 | 11/2003 | Lund et al. | |
| 6,750,890 B1 | 6/2004 | Sugimoto et al. | |
| 6,772,195 B1 | 8/2004 | Hatlelid et al. | |
| 6,804,417 B1 | 10/2004 | Lund et al. | |
| 6,842,779 B1 | 1/2005 | Nishizawa | |
| 7,342,587 B2 | 3/2008 | Danzig et al. | |
| 7,468,729 B1 | 12/2008 | Levinson | |
| 7,636,755 B2 | 12/2009 | Blattner et al. | |
| 7,639,251 B2 | 12/2009 | Gu et al. | |
| 7,775,885 B2 | 8/2010 | Van Luchene et al. | |
| 7,859,551 B2 | 12/2010 | Bulman et al. | |
| 7,885,931 B2 | 2/2011 | Seo et al. | |
| 7,925,703 B2 | 4/2011 | Dinan et al. | |
| 7,971,156 B2 | 6/2011 | Albertson et al. | |
| 7,996,793 B2 | 8/2011 | Latta et al. | |
| 8,088,044 B2 | 1/2012 | Tchao et al. | |
| 8,095,878 B2 | 1/2012 | Bates et al. | |
| 8,108,774 B2 | 1/2012 | Finn et al. | |
| 8,117,281 B2 | 2/2012 | Robinson et al. | |
| 8,130,219 B2 | 3/2012 | Fleury et al. | |
| 8,146,005 B2 | 3/2012 | Jones et al. | |
| 8,151,191 B2 | 4/2012 | Nicol | |
| RE43,993 E | 2/2013 | Park | |
| 8,384,719 B2 | 2/2013 | Reville et al. | |
| RE44,054 E | 3/2013 | Kim | |
| RE44,068 E | 3/2013 | Park | |
| RE44,106 E | 3/2013 | Park | |
| 8,396,708 B2 | 3/2013 | Park et al. | |
| RE44,121 E | 4/2013 | Park | |
| 8,425,322 B2 | 4/2013 | Gillo et al. | |
| 8,458,601 B2 | 6/2013 | Castelli et al. | |
| 8,462,198 B2 | 6/2013 | Lin et al. | |
| 8,484,158 B2 | 7/2013 | Deluca et al. | |
| 8,487,938 B2 | 7/2013 | Latta et al. | |
| 8,495,503 B2 | 7/2013 | Brown et al. | |
| 8,495,505 B2 | 7/2013 | Smith et al. | |
| 8,504,926 B2 | 8/2013 | Wolf | |
| 8,559,980 B2 | 10/2013 | Pujol | |
| 8,564,621 B2 | 10/2013 | Branson et al. | |
| 8,564,710 B2 | 10/2013 | Nonaka et al. | |
| 8,581,911 B2 | 11/2013 | Becker et al. | |
| 8,597,121 B2 | 12/2013 | del Valle | |
| 8,601,051 B2 | 12/2013 | Wang | |
| 8,601,379 B2 | 12/2013 | Marks et al. | |
| 8,632,408 B2 | 1/2014 | Gillo et al. | |
| 8,648,865 B2 | 2/2014 | Dawson et al. | |
| 8,659,548 B2 | 2/2014 | Hildreth | |
| 8,683,354 B2 | 3/2014 | Khandelwal et al. | |
| 8,692,830 B2 | 4/2014 | Nelson et al. | |
| 8,810,513 B2 | 8/2014 | Ptucha et al. | |
| 8,812,171 B2 | 8/2014 | Filev et al. | |
| 8,832,201 B2 | 9/2014 | Wall | |
| 8,832,552 B2 | 9/2014 | Arrasvuori et al. | |
| 8,839,327 B2 | 9/2014 | Amento et al. | |
| 8,856,691 B2 | 10/2014 | Geisner et al. | |
| 8,890,926 B2 | 11/2014 | Tandon et al. | |
| 8,892,999 B2 | 11/2014 | Nims et al. | |
| 8,924,250 B2 | 12/2014 | Bates et al. | |
| 8,963,926 B2 | 2/2015 | Brown et al. | |
| 8,971,572 B1 | 3/2015 | Yin et al. | |
| 8,989,786 B2 | 3/2015 | Feghali | |
| 9,086,776 B2 | 7/2015 | Ye et al. | |
| 9,105,014 B2 | 8/2015 | Collet et al. | |
| 9,191,620 B1 * | 11/2015 | Katzer | H04M 3/42042 |
| 9,225,897 B1 | 12/2015 | Sehn et al. | |
| 9,230,160 B1 | 1/2016 | Kanter | |
| 9,241,184 B2 | 1/2016 | Weerasinghe | |
| 9,256,860 B2 | 2/2016 | Herger et al. | |
| 9,270,811 B1 | 2/2016 | Atlas | |
| 9,276,886 B1 | 3/2016 | Samaranayake | |
| 9,292,082 B1 | 3/2016 | Patel et al. | |
| 9,298,257 B2 | 3/2016 | Hwang et al. | |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,705,831 B2 | 7/2017 | Spiegel |
| 9,706,040 B2 | 7/2017 | Kadirvel et al. |
| 9,742,713 B2 | 8/2017 | Spiegel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,977,523 B2 | 5/2018 | Kim et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,061,352 B1 | 8/2018 | Trail |
| 10,097,492 B2 | 10/2018 | Tsuda et al. |
| 10,102,423 B2 | 10/2018 | Shaburov et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,261,595 B1 | 4/2019 | Kin |
| 10,262,250 B1 | 4/2019 | Spiegel et al. |
| 10,269,180 B2 | 4/2019 | Yamamoto et al. |
| 10,281,992 B2 | 5/2019 | Cohen et al. |
| 10,284,508 B1 | 5/2019 | Allen et al. |
| 10,289,660 B2 | 5/2019 | Karunamuni et al. |
| 10,348,662 B2 | 7/2019 | Baldwin et al. |
| 10,362,219 B2 | 7/2019 | Wilson et al. |
| 10,402,081 B1 | 9/2019 | Andersen et al. |
| 10,432,559 B2 | 10/2019 | Baldwin et al. |
| 10,439,972 B1 | 10/2019 | Spiegel et al. |
| 10,454,857 B1 | 10/2019 | Blackstock et al. |
| 10,475,225 B2 | 11/2019 | Park et al. |
| 10,503,264 B1 | 12/2019 | Blachly et al. |
| 10,504,266 B2 | 12/2019 | Blattner et al. |
| 10,509,466 B1 | 12/2019 | Miller et al. |
| 10,514,876 B2 | 12/2019 | Sehn |
| 10,515,484 B1 | 12/2019 | Lucas et al. |
| 10,551,937 B2 | 2/2020 | Dash |
| 10,573,048 B2 | 2/2020 | Ni et al. |
| 10,579,869 B1 | 3/2020 | Xiong et al. |
| 10,591,730 B2 | 3/2020 | Rodriguez, II et al. |
| 10,614,855 B2 | 4/2020 | Huang |
| 10,645,092 B1 | 5/2020 | Bonar et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,748,347 B1 | 8/2020 | Li et al. |
| 10,762,174 B2 | 9/2020 | Denton et al. |
| 10,764,053 B2 | 9/2020 | Brook et al. |
| 10,805,248 B2 | 10/2020 | Luo et al. |
| 10,852,814 B1 | 12/2020 | Caron et al. |
| 10,857,450 B1 | 12/2020 | Aman et al. |
| 10,872,451 B2 | 12/2020 | Sheth et al. |
| 10,880,246 B2 | 12/2020 | Baldwin et al. |
| 10,895,964 B1 | 1/2021 | Grantham et al. |

(56) References Cited

U.S. PATENT DOCUMENTS

| | | |
|---|---|---|
| 10,896,534 B1 | 1/2021 | Smith et al. |
| 10,933,311 B2 | 3/2021 | Brody et al. |
| 10,938,758 B2 | 3/2021 | Allen et al. |
| 10,957,059 B1 | 3/2021 | Katz et al. |
| 10,958,608 B1 | 3/2021 | Allen et al. |
| 10,962,809 B1 | 3/2021 | Castañeda |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 10,996,846 B2 | 5/2021 | Robertson et al. |
| 10,997,787 B2 | 5/2021 | Ge et al. |
| 11,010,022 B2 | 5/2021 | Alvi et al. |
| 11,012,390 B1 | 5/2021 | Al Majid et al. |
| 11,030,454 B1 | 6/2021 | Xiong et al. |
| 11,030,789 B2 | 6/2021 | Chand et al. |
| 11,036,368 B1 | 6/2021 | Majid et al. |
| 11,036,781 B1 | 6/2021 | Baril et al. |
| 11,055,891 B1 | 7/2021 | Ofek et al. |
| 11,062,498 B1 | 7/2021 | Voss et al. |
| 11,063,891 B2 | 7/2021 | Voss |
| 11,069,103 B1 | 7/2021 | Blackstock et al. |
| 11,080,917 B2 | 8/2021 | Monroy-hernández et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,128,586 B2 | 9/2021 | Al Majid et al. |
| 11,143,867 B2 | 10/2021 | Rodriguez, II |
| 11,169,600 B1 | 11/2021 | Canberk et al. |
| 11,188,190 B2 | 11/2021 | Blackstock et al. |
| 11,189,070 B2 | 11/2021 | Jahangiri et al. |
| 11,199,957 B1 | 12/2021 | Alvi et al. |
| 11,218,433 B2 | 1/2022 | Baldwin et al. |
| 11,227,626 B1 | 1/2022 | Krishnan Gorumkonda et al. |
| 11,229,849 B2 | 1/2022 | Blackstock et al. |
| 11,233,799 B1 | 1/2022 | Whyte et al. |
| 11,245,658 B2 | 2/2022 | Grantham et al. |
| 11,249,556 B1 | 2/2022 | Schwarz et al. |
| 11,249,614 B2 | 2/2022 | Brody |
| 11,263,254 B2 | 3/2022 | Baril et al. |
| 11,270,491 B2 | 3/2022 | Monroy-Hernández et al. |
| 11,284,144 B2 | 3/2022 | Kotsopoulos et al. |
| 11,307,747 B2 | 4/2022 | Dancie et al. |
| 11,340,756 B2 | 5/2022 | Faulkner et al. |
| 11,360,733 B2 | 6/2022 | Cardenas Gasca et al. |
| 11,361,735 B1 | 6/2022 | Wang et al. |
| 11,452,939 B2 | 9/2022 | Tham et al. |
| 11,455,078 B1 | 9/2022 | Goodrich et al. |
| 11,531,402 B1 | 12/2022 | Stolzenberg |
| 11,546,505 B2 | 1/2023 | Canberk |
| 11,782,577 B2 | 10/2023 | Goodrich et al. |
| 11,797,162 B2 | 10/2023 | Goodrich et al. |
| 11,847,302 B2 | 12/2023 | Goodrich et al. |
| 11,893,301 B2 | 2/2024 | Cardenas Gasca et al. |
| 12,051,163 B2 | 7/2024 | Canberk et al. |
| 2002/0067362 A1 | 6/2002 | Agostino Nocera et al. |
| 2002/0169644 A1 | 11/2002 | Greene |
| 2003/0090524 A1 | 5/2003 | Segerberg et al. |
| 2003/0154300 A1 | 8/2003 | Mostafa |
| 2004/0203956 A1 | 10/2004 | Tsampalis |
| 2004/0233238 A1 | 11/2004 | Lahdesmaki |
| 2005/0076309 A1 | 4/2005 | Goldsmith |
| 2005/0108392 A1 | 5/2005 | Glasser et al. |
| 2005/0160451 A1 | 7/2005 | Batra et al. |
| 2005/0162419 A1 | 7/2005 | Kim et al. |
| 2005/0206610 A1 | 9/2005 | Cordelli |
| 2005/0210410 A1 | 9/2005 | Ohwa |
| 2006/0001650 A1 | 1/2006 | Robbins et al. |
| 2006/0294465 A1 | 12/2006 | Ronen et al. |
| 2007/0113181 A1 | 5/2007 | Blattner et al. |
| 2007/0150830 A1 | 6/2007 | Ording et al. |
| 2007/0168863 A1 | 7/2007 | Blattner et al. |
| 2007/0176921 A1 | 8/2007 | Iwasaki et al. |
| 2008/0094417 A1 | 4/2008 | Cohen |
| 2008/0114850 A1 | 5/2008 | Skog et al. |
| 2008/0158222 A1 | 7/2008 | Li et al. |
| 2009/0012788 A1 | 1/2009 | Gilbert et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0125811 A1 | 5/2010 | Moore et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2010/0289740 A1 | 11/2010 | Kim et al. |
| 2011/0050562 A1 | 3/2011 | Schoen et al. |
| 2011/0093780 A1 | 4/2011 | Dunn |
| 2011/0109577 A1 | 5/2011 | Lee et al. |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2011/0292177 A1 | 12/2011 | Sakurai et al. |
| 2011/0301934 A1 | 12/2011 | Tardif |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0144331 A1 | 6/2012 | Tolonen et al. |
| 2012/0214585 A1 | 8/2012 | Paquet |
| 2012/0236031 A1 | 9/2012 | Haddick et al. |
| 2012/0249416 A1 | 10/2012 | Maciocci et al. |
| 2013/0016070 A1 | 1/2013 | Starner et al. |
| 2013/0044129 A1 | 2/2013 | Latta et al. |
| 2013/0088455 A1 | 4/2013 | Jeong |
| 2013/0103760 A1 | 4/2013 | Golding et al. |
| 2013/0134212 A1 | 5/2013 | Chang |
| 2013/0201187 A1 | 8/2013 | Tong et al. |
| 2013/0249948 A1 | 9/2013 | Reitan |
| 2013/0254695 A1 | 9/2013 | Lambourne et al. |
| 2013/0257877 A1 | 10/2013 | Davis |
| 2013/0286004 A1 | 10/2013 | Mcculloch et al. |
| 2014/0043329 A1 | 2/2014 | Wang et al. |
| 2014/0053086 A1 | 2/2014 | Kim et al. |
| 2014/0055343 A1 | 2/2014 | Kim |
| 2014/0055554 A1 | 2/2014 | Du et al. |
| 2014/0115114 A1 | 4/2014 | Garmark et al. |
| 2014/0125678 A1 | 5/2014 | Wang et al. |
| 2014/0129343 A1 | 5/2014 | Finster et al. |
| 2014/0171036 A1 | 6/2014 | Simmons |
| 2014/0267189 A1 | 9/2014 | Moll et al. |
| 2014/0289676 A1 | 9/2014 | Yoritate et al. |
| 2014/0375683 A1 | 12/2014 | Salter et al. |
| 2015/0009124 A1 | 1/2015 | Antoniac |
| 2015/0062162 A1 | 3/2015 | Kim et al. |
| 2015/0078586 A1 | 3/2015 | Ang et al. |
| 2015/0085058 A1 | 3/2015 | Zhang et al. |
| 2015/0103021 A1 | 4/2015 | Lim et al. |
| 2015/0120293 A1 | 4/2015 | Wohlert et al. |
| 2015/0126281 A1 | 5/2015 | Lewis |
| 2015/0186002 A1 | 7/2015 | Suzuki et al. |
| 2015/0187357 A1 | 7/2015 | Xia et al. |
| 2015/0206349 A1 | 7/2015 | Rosenthal et al. |
| 2015/0271120 A1 | 9/2015 | Langholz |
| 2015/0287403 A1 | 10/2015 | Holzer Zaslansky et al. |
| 2015/0306496 A1 | 10/2015 | Haseltine |
| 2015/0309316 A1 | 10/2015 | Osterhout et al. |
| 2015/0324087 A1 | 11/2015 | Gregory et al. |
| 2015/0324645 A1 | 11/2015 | Jang et al. |
| 2015/0370320 A1 | 12/2015 | Connor |
| 2016/0021148 A1 | 1/2016 | Ijaz |
| 2016/0113550 A1 | 4/2016 | Martin |
| 2016/0134840 A1 | 5/2016 | Mcculloch |
| 2016/0162531 A1 | 6/2016 | Beattie, Jr. et al. |

(56) References Cited

U.S. PATENT DOCUMENTS

| | | |
|---|---|---|
| 2016/0189315 A1 | 6/2016 | Anania et al. |
| 2016/0232715 A1 | 8/2016 | Lee |
| 2016/0234149 A1 | 8/2016 | Tsuda et al. |
| 2016/0259517 A1 | 9/2016 | Butcher et al. |
| 2016/0320853 A1 | 11/2016 | Lien et al. |
| 2016/0346612 A1 | 12/2016 | Rowley |
| 2017/0038829 A1 | 2/2017 | Lanier et al. |
| 2017/0046058 A1 | 2/2017 | Karunamuni et al. |
| 2017/0080346 A1 | 3/2017 | Abbas |
| 2017/0087473 A1 | 3/2017 | Siegel et al. |
| 2017/0090747 A1 | 3/2017 | Dash |
| 2017/0097687 A1 | 4/2017 | Pinault et al. |
| 2017/0111723 A1 | 4/2017 | Boesen |
| 2017/0113140 A1 | 4/2017 | Blackstock et al. |
| 2017/0118145 A1 | 4/2017 | Aittoniemi et al. |
| 2017/0123487 A1 | 5/2017 | Hazra et al. |
| 2017/0192495 A1 | 7/2017 | Drinkwater et al. |
| 2017/0195736 A1 | 7/2017 | Chai et al. |
| 2017/0195739 A1 | 7/2017 | Wessel |
| 2017/0199855 A1 | 7/2017 | Fishbeck |
| 2017/0228130 A1 | 8/2017 | Palmaro |
| 2017/0235848 A1 | 8/2017 | Van et al. |
| 2017/0277684 A1 | 9/2017 | Dharmarajan Mary |
| 2017/0277685 A1 | 9/2017 | Takumi |
| 2017/0287225 A1 | 10/2017 | Powderly et al. |
| 2017/0307889 A1 | 10/2017 | Newman |
| 2017/0310934 A1 | 10/2017 | Du et al. |
| 2017/0312634 A1 | 11/2017 | Ledoux et al. |
| 2017/0322655 A1 | 11/2017 | Stafford |
| 2017/0351910 A1 | 12/2017 | Elwazer et al. |
| 2017/0354875 A1 | 12/2017 | Marks et al. |
| 2018/0004392 A1 | 1/2018 | Yang et al. |
| 2018/0033204 A1 | 2/2018 | Dimitrov et al. |
| 2018/0034867 A1 | 2/2018 | Zahn et al. |
| 2018/0046245 A1 | 2/2018 | Schwarz et al. |
| 2018/0047200 A1 | 2/2018 | O'hara et al. |
| 2018/0062691 A1 | 3/2018 | Barnett, Jr. |
| 2018/0067914 A1 | 3/2018 | Chen et al. |
| 2018/0075658 A1 | 3/2018 | Lanier et al. |
| 2018/0088663 A1 | 3/2018 | Zhang et al. |
| 2018/0101986 A1 | 4/2018 | Burns et al. |
| 2018/0107276 A1 | 4/2018 | Heubel et al. |
| 2018/0113587 A1 | 4/2018 | Allen et al. |
| 2018/0115503 A1 | 4/2018 | Baldwin et al. |
| 2018/0158370 A1 | 6/2018 | Pryor |
| 2018/0198743 A1 | 7/2018 | Blackstock et al. |
| 2018/0239144 A1 | 8/2018 | Woods et al. |
| 2018/0268589 A1 | 9/2018 | Grant |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0315247 A1 | 11/2018 | Van |
| 2018/0321826 A1 | 11/2018 | Bereza et al. |
| 2018/0329209 A1 | 11/2018 | Nattukallingal |
| 2018/0335930 A1 | 11/2018 | Scapel et al. |
| 2018/0343023 A1 | 11/2018 | Park et al. |
| 2018/0349690 A1 | 12/2018 | Rhee et al. |
| 2018/0350144 A1 | 12/2018 | Rathod |
| 2018/0350150 A1 | 12/2018 | Powderly et al. |
| 2019/0001223 A1 | 1/2019 | Blackstock et al. |
| 2019/0019508 A1 | 1/2019 | Rochford et al. |
| 2019/0052587 A1 | 2/2019 | Andreou et al. |
| 2019/0054379 A1 | 2/2019 | Ackley et al. |
| 2019/0057616 A1 | 2/2019 | Cohen et al. |
| 2019/0066387 A1 | 2/2019 | Grossmann et al. |
| 2019/0097958 A1 | 3/2019 | Collet et al. |
| 2019/0146219 A1 | 5/2019 | Rodriguez, II |
| 2019/0151757 A1 | 5/2019 | Kozloski et al. |
| 2019/0172262 A1 | 6/2019 | Mchugh et al. |
| 2019/0187765 A1 | 6/2019 | Ashwood et al. |
| 2019/0188920 A1 | 6/2019 | Mcphee et al. |
| 2019/0205010 A1 | 7/2019 | Fujii et al. |
| 2019/0266405 A1 | 8/2019 | Chang |
| 2019/0272674 A1 | 9/2019 | Comer et al. |
| 2019/0280997 A1 | 9/2019 | Baldwin et al. |
| 2019/0295320 A1 | 9/2019 | Ghatak et al. |
| 2019/0307982 A1 | 10/2019 | Brodsky |
| 2019/0310757 A1 | 10/2019 | Lee et al. |
| 2019/0311513 A1 | 10/2019 | Han et al. |
| 2019/0318540 A1 | 10/2019 | Piemonte et al. |
| 2019/0340799 A1 | 11/2019 | Dryer et al. |
| 2019/0342507 A1 | 11/2019 | Dye et al. |
| 2019/0356705 A1 | 11/2019 | Escudero et al. |
| 2019/0362557 A1 | 11/2019 | Lacey et al. |
| 2019/0369839 A1 | 12/2019 | Yang et al. |
| 2020/0005026 A1 | 1/2020 | Andersen et al. |
| 2020/0034033 A1 | 1/2020 | Chaudhri et al. |
| 2020/0036830 A1 | 1/2020 | Hatanaka et al. |
| 2020/0042095 A1 | 2/2020 | Ang et al. |
| 2020/0059502 A1 | 2/2020 | Iyer et al. |
| 2020/0066049 A1 | 2/2020 | Sun et al. |
| 2020/0073483 A1 | 3/2020 | Berenzweig et al. |
| 2020/0098187 A1 | 3/2020 | Herscher et al. |
| 2020/0104039 A1 | 4/2020 | Robertson et al. |
| 2020/0162851 A1 | 5/2020 | Wilde |
| 2020/0167120 A1 | 5/2020 | Rakshit et al. |
| 2020/0201514 A1 | 6/2020 | Murphy et al. |
| 2020/0226814 A1 | 7/2020 | Tang et al. |
| 2020/0226835 A1 | 7/2020 | Farchy et al. |
| 2020/0279104 A1 | 9/2020 | Andersen et al. |
| 2020/0293155 A1 | 9/2020 | Shin |
| 2020/0301500 A1 | 9/2020 | Wilde et al. |
| 2020/0301575 A1 | 9/2020 | Lindholm et al. |
| 2020/0306637 A1 | 10/2020 | Baldwin et al. |
| 2020/0348767 A1 | 11/2020 | Araújo et al. |
| 2020/0360823 A1 | 11/2020 | Cahill et al. |
| 2020/0372127 A1 | 11/2020 | Denton et al. |
| 2020/0387228 A1 | 12/2020 | Ravasz et al. |
| 2020/0387286 A1 | 12/2020 | Ravasz et al. |
| 2020/0410575 A1 | 12/2020 | Grantham et al. |
| 2021/0004146 A1 | 1/2021 | Linville et al. |
| 2021/0011612 A1 | 1/2021 | Dancie et al. |
| 2021/0019739 A1 | 1/2021 | Almonte et al. |
| 2021/0042724 A1 | 2/2021 | Rathod |
| 2021/0051147 A1 | 2/2021 | Hardy et al. |
| 2021/0074016 A1 | 3/2021 | Li et al. |
| 2021/0074047 A1 | 3/2021 | Sheth et al. |
| 2021/0089179 A1 | 3/2021 | Grantham et al. |
| 2021/0097286 A1 | 4/2021 | Lehrich et al. |
| 2021/0104087 A1 | 4/2021 | Smith et al. |
| 2021/0118231 A1* | 4/2021 | Hutten .................... G06F 3/011 |
| 2021/0119884 A1 | 4/2021 | Kim et al. |
| 2021/0157412 A1 | 5/2021 | Katz |
| 2021/0166732 A1 | 6/2021 | Shaburova et al. |
| 2021/0168108 A1 | 6/2021 | Antmen et al. |
| 2021/0170270 A1 | 6/2021 | Brody et al. |
| 2021/0174034 A1 | 6/2021 | Retek et al. |
| 2021/0192823 A1 | 6/2021 | Amitay et al. |
| 2021/0200324 A1 | 7/2021 | Doganis |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0241529 A1 | 8/2021 | Cowburn et al. |
| 2021/0243482 A1 | 8/2021 | Baril et al. |
| 2021/0243503 A1 | 8/2021 | Kotsopoulos et al. |
| 2021/0248827 A1 | 8/2021 | Baier et al. |
| 2021/0266277 A1 | 8/2021 | Allen et al. |
| 2021/0281897 A1 | 9/2021 | Brody et al. |
| 2021/0285774 A1 | 9/2021 | Collins et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0306290 A1 | 9/2021 | Voss |
| 2021/0306451 A1 | 9/2021 | Heikkinen et al. |
| 2021/0334733 A1 | 10/2021 | Peters |
| 2021/0362029 A1 | 11/2021 | Koblin et al. |
| 2021/0364811 A1 | 11/2021 | Amadio |
| 2021/0382564 A1 | 12/2021 | Blachly et al. |
| 2021/0385180 A1 | 12/2021 | Al Majid et al. |
| 2021/0397000 A1 | 12/2021 | Rodriguez, II |
| 2021/0405761 A1 | 12/2021 | Canberk |
| 2021/0405772 A1 | 12/2021 | Canberk et al. |
| 2021/0405831 A1 | 12/2021 | Mourkogiannis et al. |
| 2021/0409535 A1 | 12/2021 | Mourkogiannis et al. |

(56) References Cited

U.S. PATENT DOCUMENTS

| | | |
|---|---|---|
| 2021/0409954 A1 | 12/2021 | Frisk et al. |
| 2022/0012929 A1 | 1/2022 | Blackstock et al. |
| 2022/0030197 A1* | 1/2022 | Ishimoto ............... G06T 13/40 |
| 2022/0075591 A1 | 3/2022 | Cardenas Gasca et al. |
| 2022/0092857 A1 | 3/2022 | Haapoja et al. |
| 2022/0101000 A1 | 3/2022 | Tham et al. |
| 2022/0157002 A1 | 5/2022 | Gelencser |
| 2022/0179665 A1 | 6/2022 | Rathod |
| 2022/0188539 A1 | 6/2022 | Chan et al. |
| 2022/0197027 A1 | 6/2022 | Goodrich et al. |
| 2022/0197393 A1 | 6/2022 | Goodrich et al. |
| 2022/0197446 A1 | 6/2022 | Goodrich et al. |
| 2022/0197485 A1 | 6/2022 | Goodrich et al. |
| 2022/0198603 A1 | 6/2022 | Goodrich et al. |
| 2022/0206588 A1 | 6/2022 | Canberk et al. |
| 2022/0222881 A1 | 7/2022 | Nakade et al. |
| 2022/0276823 A1 | 9/2022 | Cardenas Gasca et al. |
| 2022/0300730 A1 | 9/2022 | Eirinberg et al. |
| 2022/0300731 A1 | 9/2022 | Eirinberg et al. |
| 2022/0301231 A1 | 9/2022 | Eirinberg et al. |
| 2022/0326781 A1 | 10/2022 | Hwang et al. |
| 2022/0334649 A1 | 10/2022 | Hwang et al. |
| 2022/0375174 A1 | 11/2022 | Arya et al. |
| 2022/0382377 A1 | 12/2022 | Hosseinkhani Loorak et al. |
| 2023/0055634 A1 | 2/2023 | Goodrich et al. |
| 2023/0297161 A1 | 9/2023 | Moll |
| 2023/0400965 A1 | 12/2023 | Goodrich et al. |
| 2023/0418542 A1 | 12/2023 | Cardenas Gasca |
| 2024/0012549 A1 | 1/2024 | Goodrich et al. |
| 2024/0032121 A1 | 1/2024 | Zhuang et al. |
| 2024/0050856 A1 | 2/2024 | Canberk et al. |
| 2024/0071000 A1 | 2/2024 | Canberk et al. |
| 2024/0119679 A1 | 4/2024 | Canberk et al. |
| 2024/0338910 A1 | 10/2024 | Canberk et al. |

FOREIGN PATENT DOCUMENTS

| | | | |
|---|---|---|---|
| CN | 109885367 A | 6/2019 | |
| CN | 110168478 | 8/2019 | |
| CN | 116113478 | 5/2023 | |
| CN | 116635771 A | 8/2023 | |
| CN | 116670632 A | 8/2023 | |
| CN | 116685938 A | 9/2023 | |
| CN | 116724286 A | 9/2023 | |
| CN | 116802590 A | 9/2023 | |
| EP | 2184092 | 5/2010 | |
| EP | 3707693 A1 | 9/2020 | |
| EP | 4172726 A1 | 5/2023 | |
| EP | 4172730 A1 | 5/2023 | |
| JP | 2001230801 | 8/2001 | |
| JP | 5497931 | 3/2014 | |
| JP | 2018032329 A | 3/2018 | |
| KR | 20120040000 | 4/2012 | |
| KR | 101445263 | 9/2014 | |
| KR | 20150051769 A | 5/2015 | |
| KR | 20210121616 | 10/2021 | |
| KR | 20220158824 A | 12/2022 | |
| WO | 2003094072 | 11/2003 | |
| WO | 2004095308 | 11/2004 | |
| WO | 2006107182 | 10/2006 | |
| WO | 2007134402 | 11/2007 | |
| WO | WO-2009137419 A2 | 11/2009 | |
| WO | 2012139276 | 10/2012 | |
| WO | 2013027893 | 2/2013 | |
| WO | WO-2013064854 A1* | 5/2013 | ......... G06F 3/04815 |
| WO | 2013152454 | 10/2013 | |
| WO | 2013166588 | 11/2013 | |
| WO | 2014031899 | 2/2014 | |
| WO | 2014194439 | 12/2014 | |
| WO | WO-2015192117 A1 | 12/2015 | |
| WO | 2016090605 | 6/2016 | |
| WO | WO-2016168591 A1 | 10/2016 | |
| WO | 2018081013 | 5/2018 | |
| WO | 2018102562 | 6/2018 | |
| WO | 2018129531 | 7/2018 | |
| WO | 2019089613 | 5/2019 | |
| WO | WO-2019094618 A1 | 5/2019 | |
| WO | WO-2022005687 A1 | 1/2022 | |
| WO | WO-2022005693 A1 | 1/2022 | |
| WO | 2022056132 | 3/2022 | |
| WO | WO-2022060549 A2 | 3/2022 | |
| WO | WO-2022066578 A1 | 3/2022 | |
| WO | WO-2022060549 A3 | 4/2022 | |
| WO | WO-2022132381 A1 | 6/2022 | |
| WO | WO-2022140113 A1 | 6/2022 | |
| WO | WO-2022140117 A1 | 6/2022 | |
| WO | WO-2022140129 A1 | 6/2022 | |
| WO | WO-2022140734 A1 | 6/2022 | |
| WO | WO-2022140739 A1 | 6/2022 | |
| WO | WO-2022146678 A1 | 7/2022 | |
| WO | 2022170222 | 8/2022 | |
| WO | WO-2022198182 A1 | 9/2022 | |
| WO | WO-2022216784 A1 | 10/2022 | |
| WO | WO-2022225761 A1 | 10/2022 | |
| WO | WO-2022245765 A1 | 11/2022 | |
| WO | WO-2023177661 A1 | 9/2023 | |
| WO | WO-2024020389 A1 | 1/2024 | |
| WO | 2024044138 | 2/2024 | |
| WO | 2024044184 | 2/2024 | |
| WO | WO-2024035763 A1 | 2/2024 | |
| WO | 2024076613 | 4/2024 | |

OTHER PUBLICATIONS

"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.

"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.

"U.S. Appl. No. 17/248,981, Response filed Dec. 20, 2021 to Non Final Office Action mailed Sep. 30, 2021", 11 pgs.

"U.S. Appl. No. 17/248,981, Notice of Allowance mailed Feb. 16, 2022", 12 pgs.

"International Application Serial No. PCT/US2021/049672, Invitation to Pay Additional Fees mailed Jan. 14, 2022", 15 pgs.

"International Application Serial No. PCT/US2021/049672, International Search Report mailed Mar. 9, 2022", 6 pgs.

"International Application Serial No. PCT/US2021/049672, Written Opinion mailed Mar. 9, 2022", 15 pgs.

"Bitmoji", Snapchat Support, [Online] Retrieved from the Internet: <URL: https://web.archive.org/web/20190503063620/https://support.snapchat.com/en-us/a/bitmoji>, (captured May 3, 2019), 2 pgs.

"Manage Your Bitmoji", Snapchat Support, [Online] Retrieved from the Internet: <URL: https://web.archive.org/web/20190503063620/https://support.snapchat.com/en-us/a/manage-bitmoji>, (captured May 3, 2019), 3 pgs.

"Bitmoji Family", Snapchat Support, [Online] Retrieved from the Internet: <URL: https://web.archive.org/web/20190503063620/https://support.snapchat.com/en-us/article/bitmoji-family>, (captured May 3, 2019), 4 pgs.

"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.

"Instant Comics Starring You and Your Friends", Bitstrips Inc, [Online] Retrieved from the Internet: <URL: https://web.archive.org/web/20150206000940/http:/company.bitstrips.com/bitstrips-app.html>, (captured Feb. 6, 2015), 3 pgs.

"U.S. Appl. No. 17/663,594, Non Final Office Action mailed Sep. 29, 2022", 65 pgs.

Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.

(56) References Cited

OTHER PUBLICATIONS

Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.

Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.

MacMillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.

Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.

Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.

Reign, Ashley, "How To Add My Friend's Bitmoji To My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.

Tumbokon, Karen, "Snapchat Update: How To Add Bitmoji To Customizable Geofilters", International Business Times, [Online] Retrieved from the Internet : <URL: https://www.ibtimes.com/snapchat-update-how-add-bitmojicustomizable- geofilters-2448152>, (Nov. 18, 2016), 6 pgs.

"U.S. Appl. No. 17/301,284, Corrected Notice of Allowability mailed Jun. 2, 2022", 2 pgs.

"U.S. Appl. No. 17/301,284, Corrected Notice of Allowability mailed Aug. 23, 2022", 2 pgs.

"U.S. Appl. No. 17/301,284, Non Final Office Action mailed Dec. 14, 2021", 27 pgs.

"U.S. Appl. No. 17/301,284, Notice of Allowance mailed May 20, 2022", 8 pgs.

"U.S. Appl. No. 17/301,284, Response filed Mar. 14, 2022 to Non Final Office Action mailed Dec. 14, 2021", 10 pgs.

"U.S. Appl. No. 17/410,787, Corrected Notice of Allowability mailed Jan. 11, 2023", 2 pgs.

"U.S. Appl. No. 17/410,787, Final Office Action mailed Dec. 27, 2023", 17 pgs.

"U.S. Appl. No. 17/410,787, Non Final Office Action mailed Aug. 17, 2022", 15 pgs.

"U.S. Appl. No. 17/410,787, Non Final Office Action mailed Aug. 29, 2023", 14 pgs.

"U.S. Appl. No. 17/410,787, Notice of Allowance mailed Dec. 29, 2022", 12 pgs.

"U.S. Appl. No. 17/410,787, Response filed Jan. 31, 2024 to Final Office Action mailed Dec. 27, 2023", 11 pgs.

"U.S. Appl. No. 17/410,787, Response filed Nov. 1, 2023 to Non Final Office Action mailed Aug. 29, 2023", 10 pgs.

"U.S. Appl. No. 17/410,787, Response filed Nov. 4, 2022 to Non Final Office Action mailed Aug. 17, 2022", 9 pgs.

"U.S. Appl. No. 17/410,814, 312 Amendment filed Aug. 25, 2023", 3 pgs.

"U.S. Appl. No. 17/410,814, Advisory Action mailed Apr. 17, 2023", 5 pgs.

"U.S. Appl. No. 17/410,814, Advisory Action mailed Aug. 30, 2022", 4 pgs.

"U.S. Appl. No. 17/410,814, Final Office Action mailed Feb. 8, 2023", 24 pgs.

"U.S. Appl. No. 17/410,814, Final Office Action mailed Jun. 7, 2022", 21 pgs.

"U.S. Appl. No. 17/410,814, Non Final Office Action malled Jan. 12, 2022", 22 pgs.

"U.S. Appl. No. 17/410,814, Non Final Office Action malled Oct. 3, 2022", 21 pgs.

"U.S. Appl. No. 17/410,814, Notice of Allowance malled May 25, 2023", 11 pgs.

"U.S. Appl. No. 17/410,814, Response filed Mar. 30, 2022 to Non Final Office Action mailed Jan. 12, 2022", 13 pgs.

"U.S. Appl. No. 17/410,814, Response filed Apr. 6, 2023 to Final Office Action mailed Feb. 8, 2023", Response to Final Office Action, 13 pgs.

"U.S. Appl. No. 17/410,814, Response filed Apr. 19, 2023 to Advisory Action mailed Apr. 17, 2023", 13 pgs.

"U.S. Appl. No. 17/410,814, Response filed Aug. 5, 2022 to Final Office Action mailed Jun. 7, 2022", 11 pgs.

"U.S. Appl. No. 17/410,814, Response filed Dec. 30, 2022 to Non Final Office Action mailed Oct. 3, 2022", 11 pgs.

"U.S. Appl. No. 17/410,814, Supplemental Notice of Allowability mailed Jun. 29, 2023", 8 pgs.

"U.S. Appl. No. 17/445,767, Advisory Action mailed Mar. 17, 2023", 2 pgs.

"U.S. Appl. No. 17/445,767, Final Office Action mailed Feb. 9, 2023", 26 pgs.

"U.S. Appl. No. 17/445,767, Final Office Action mailed Sep. 13, 2023", 30 pgs.

"U.S. Appl. No. 17/445,767, Non Final Office Action mailed Jun. 1, 2023", 25 pgs.

"U.S. Appl. No. 17/445,767, Non Final Office Action mailed Sep. 9, 2022", 25 pgs.

"U.S. Appl. No. 17/445,767, Response filed Mar. 7, 2023 to Non Final Office Action mailed Sep. 9, 2022", 10 pgs.

"U.S. Appl. No. 17/445,767, Response filed Sep. 1, 2023 to Non Final Office Action mailed Jun. 1, 2023", 13 pgs.

"U.S. Appl. No. 17/445,767, Response filed Dec. 7, 2022 to Non Final Office Action mailed Sep. 9, 2022", 11 pgs.

"U.S. Appl. No. 17/445,772, Advisory Action mailed Feb. 10, 2023", 3 pgs.

"U.S. Appl. No. 17/445,772, Advisory Action mailed Nov. 17, 2023", 3 pgs.

"U.S. Appl. No. 17/445,772, Final Office Action mailed Sep. 22, 2023", 46 pgs.

"U.S. Appl. No. 17/445,772, Final Office Action mailed Dec. 1, 2022", 42 pgs.

"U.S. Appl. No. 17/445,772, Non Final Office Action mailed Jan. 10, 2024", 45 pgs.

"U.S. Appl. No. 17/445,772, Non Final Office Action mailed Mar. 10, 2023", 36 pgs.

"U.S. Appl. No. 17/445,772, Non Final Office Action mailed Jun. 17, 2022", 38 pgs.

"U.S. Appl. No. 17/445,772, Response filed Jan. 31, 2023 to Final Office Action malled Dec. 1, 2022", 12 pgs.

"U.S. Appl. No. 17/445,772, Response filed Jun. 9, 2023 to Non Final Office Action mailed Mar. 10, 2023", 14 pgs.

"U.S. Appl. No. 17/445,772, Response filed Sep. 16, 2022 to Non Final Office Action mailed Jun. 17, 2022", 11 pgs.

"U.S. Appl. No. 17/445,772, Response filed Nov. 8, 2023 to Final Office Action mailed Sep. 22, 2023", 13 pgs.

"U.S. Appl. No. 17/445,774, Advisory Action mailed Mar. 9, 2023", 6 pgs.

"U.S. Appl. No. 17/445,774, Corrected Notice of Allowability mailed Jul. 6, 2023", 2 pgs.

"U.S. Appl. No. 17/445,774, Final Office Action mailed Dec. 22, 2022", 29 pgs.

"U.S. Appl. No. 17/445,774, Non Final Office Action mailed Jul. 13, 2022", 26 pgs.

"U.S. Appl. No. 17/445,774, Notice of Allowance mailed Jun. 22, 2023", 20 pgs.

"U.S. Appl. No. 17/445,774, Response filed Feb. 22, 2023 to Final Office Action mailed Dec. 22, 2022", 10 pgs.

"U.S. Appl. No. 17/445,774, Response filed Oct. 12, 2022 to Non Final Office Action mailed Jul. 13, 2022", 12 pgs.

"U.S. Appl. No. 17/655,125, Final Office Action mailed Apr. 25, 2023", 21 pgs.

(56) References Cited

OTHER PUBLICATIONS

"U.S. Appl. No. 17/655,125, Final Office Action mailed Nov. 15, 2023", 23 pgs.
"U.S. Appl. No. 17/655,125, Non Final Office Action mailed Jul. 24, 2023", 22 pgs.
"U.S. Appl. No. 17/655,125, Non Final Office Action mailed Nov. 8, 2022", 20 pgs.
"U.S. Appl. No. 17/655,125, Response filed Feb. 8, 2023 to Non Final Office Action mailed Nov. 8, 2022", 12 pgs.
"U.S. Appl. No. 17/655,125, Response filed Jun. 29, 2023 to Final Office Action mailed Apr. 25, 2023", 11 pgs.
"U.S. Appl. No. 17/655,125, Response filed Oct. 24, 2023 to Non Final Office Action mailed Jul. 24, 2023", 11 pgs.
"U.S. Appl. No. 17/821,741, Corrected Notice of Allowability mailed Aug. 11, 2023", 2 pgs.
"U.S. Appl. No. 17/821,741, Non Final Office Action mailed Mar. 8, 2023", 15 pgs.
"U.S. Appl. No. 17/821,741, Notice of Allowance mailed Jul. 28, 2023", 8 pgs.
"U.S. Appl. No. 17/821,741, Response filed Jun. 8, 2023 to Non Final Office Action mailed Mar. 8, 2023", 12 pgs.
"International Application Serial No. PCT/US2021/063307, International Preliminary Report on Patentability mailed Jul. 6, 2023", 12 pgs.
"International Application Serial No. PCT/US2021/063307, International Search Report mailed May 12, 2022", 6 pgs.
"International Application Serial No. PCT/US2021/063307, Invitation to Pay Additional Fees mailed Mar. 21, 2022", 12 pgs.
"International Application Serial No. PCT/US2021/063307, Written Opinion mailed May 12, 2022", 10 pgs.
"International Application Serial No. PCT/US2021/063350, International Preliminary Report on Patentability mailed Jul. 6, 2023", 7 pgs.
"International Application Serial No. PCT/US2021/063350, International Search Report mailed Apr. 5, 2022", 4 pgs.
"International Application Serial No. PCT/US2021/063350, Written Opinion mailed Apr. 5, 2022", 5 pgs.
"International Application Serial No. PCT/US2021/063553, International Preliminary Report on Patentability mailed Jul. 6, 2023", 10 pgs.
"International Application Serial No. PCT/US2021/063553, International Search Report mailed Mar. 18, 2022", 4 pgs.
"International Application Serial No. PCT/US2021/063553, Written Opinion mailed Mar. 18, 2022", 8 pgs.
"International Application Serial No. PCT/US2021/072864, International Preliminary Report on Patentability mailed Jul. 6, 2023", 9 pgs.
"International Application Serial No. PCT/US2021/072864, International Search Report mailed Mar. 29, 2022", 4 pgs.
"International Application Serial No. PCT/US2021/072864, Written Opinion mailed Mar. 29, 2022", 7 pgs.
"International Application Serial No. PCT/US2021/072959, International Preliminary Report on Patentability mailed Jul. 6, 2023", 9 pgs.
"International Application Serial No. PCT/US2021/072959, International Search Report mailed Apr. 5, 2022", 5 pgs.
"International Application Serial No. PCT/US2021/072959, Written Opinion mailed Apr. 5, 2022", 7 pgs.
"International Application Serial No. PCT/US2023/015179, International Search Report mailed Aug. 21, 2023", 4 pgs.
"International Application Serial No. PCT/US2023/015179, Written Opinion mailed Aug. 21, 2023", 4 pgs.
"Skype for Business User Guide", Information Services, Heriot-Watt University, UK, [Online] Retrieved from the Internet:. <URL:https://www.hw.ac.uk/services/docs/is/skypeforbusinesssuserguidev2.0.pdf>, [retrieved on Apr. 12, 2022], (2019), 16 pgs.
Wang, Wallace, "Mac OS X for Absolute Beginners", Apress, (2016), 507 pgs.
"U.S. Appl. No. 17/663,594, Response filed Dec. 29, 2022 to Non Final Office Action mailed Sep. 29, 2022", 11 pgs.
"International Application Serial No. PCT/US2021/049672, International Preliminary Report on Patentability mailed Mar. 23, 2023", 17 pgs.
"U.S. Appl. No. 17/663,594, Final Office Action mailed Apr. 4, 2023", 51 pgs.
"U.S. Appl. No. 17/663,594, Response filed May 9, 2023 to Final Office Action mailed Apr. 4, 2023", 12 pgs.
"U.S. Appl. No. 17/663,594, Advisory Action mailed Jun. 7, 2023", 4 pgs.
"U.S. Appl. No. 17/895,449, Non Final Office Action mailed Jun. 8, 2023", 9 pgs.
"U.S. Appl. No. 17/663,594, Examiner Interview Summary mailed Jun. 27, 2023", 2 pgs.
"U.S. Appl. No. 17/663,594, Response filed Jun. 29, 2023 to Advisory Action mailed Jun. 7, 2023", 13 pgs.
"U.S. Appl. No. 17/663,594, Notice of Allowance mailed Aug. 9, 2023", 14 pgs.
"U.S. Appl. No. 17/895,449, Response filed Aug. 16, 2023 to Non Final Office Action mailed Jun. 8, 2023", 10 pgs.
"International Application Serial No. PCT/US2023/070415, International Search Report mailed Nov. 3, 2023", 5 pgs.
"International Application Serial No. PCT/US2023/070415, Written Opinion mailed Nov. 3, 2023", 4 pgs.
"International Application Serial No. PCT/US2023/029814, Invitation to Pay Additional Fees mailed Nov. 9, 2023", 6 pgs.
"International Application Serial No. PCT/US2023/030818, International Search Report mailed Nov. 28, 2023", 3 pgs.
"International Application Serial No. PCT/US2023/030818, Written Opinion mailed Nov. 28, 2023", 5 pgs.
"U.S. Appl. No. 17/895,449, Notice of Allowance mailed Dec. 7, 2023", 9 pgs.
"International Application Serial No. PCT/US2023/034437, International Search Report mailed Dec. 13, 2023", 4 pgs.
"International Application Serial No. PCT/US2023/034437, Written Opinion mailed Dec. 13, 2023", 6 pgs.
"International Application Serial No. PCT/US2023/030711, International Search Report mailed Dec. 12, 2023", 3 pgs.
"International Application Serial No. PCT/US2023/030711, Written Opinion mailed Dec. 12, 2023", 4 pgs.
"U.S. Appl. No. 17/895,449, Supplemental Notice of Allowability mailed Dec. 21, 2023", 2 pgs.
"U.S. Appl. No. 17/663,594, Notice of Allowability mailed Jan. 3, 2024", 3 pgs.
"International Application Serial No. PCT/US2023/029814, International Search Report mailed Jan. 9, 2024", 6 pgs.
"International Application Serial No. PCT/US2023/029814, Written Opinion mailed Jan. 9, 2024", 8 pgs.
"U.S. Appl. No. 17/895,449, Notice of Allowance mailed Mar. 18, 2024", 5 pgs.
"U.S. Appl. No. 18/243,815, Non Final Office Action mailed Apr. 19, 2024", 45 pgs.
"U.S. Appl. No. 17/887,215, Examiner Interview Summary mailed Sep. 16, 2024", 2 pgs.
"U.S. Appl. No. 17/887,215, Non Final Office Action mailed Jul. 12, 2024", 11 pgs.
"U.S. Appl. No. 17/887,215, Response filed Sep. 13, 2024 to Non Final Office Action mailed Jul. 12, 2024", 10 pgs.
"U.S. Appl. No. 17/960,627, Examiner Interview Summary mailed Sep. 9, 2024", 2 pgs.
"U.S. Appl. No. 17/960,627, Non Final Office Action mailed Jun. 21, 2024", 11 pgs.
"U.S. Appl. No. 17/960,627, Notice of Allowance mailed Oct. 8, 2024", 7 pgs.
"U.S. Appl. No. 17/960,627, Response filed Sep. 19, 2024 to Non Final Office Action mailed Jun. 21, 2024", 9 pgs.
"U.S. Appl. No. 18/243,815, Advisory Action mailed Oct. 23, 2024", 4 pgs.
"U.S. Appl. No. 18/243,815, Examiner Interview Summary mailed Jun. 14, 2024", 2 pgs.
"U.S. Appl. No. 18/243,815, Final Office Action mailed Aug. 7, 2024", 73 pgs.
"U.S. Appl. No. 18/243,815, Response filed Jun. 20, 2024 to Non Final Office Action mailed Apr. 19, 2024", 13 pgs.

(56) References Cited

OTHER PUBLICATIONS

"U.S. Appl. No. 18/243,815, Response filed Oct. 7, 2024 to Final Office Action mailed Aug. 7, 2024", 13 pgs.
"U.S. Appl. No. 17/887,215, Notice of Allowance mailed Nov. 22, 2024", 7 pgs.

* cited by examiner

AVATAR CALL ON AN EYEWEAR DEVICE

BACKGROUND

Some electronics-enabled eyewear devices, such as so-called smart glasses, allow users to interact with virtual content (e.g., augmented reality (AR) objects) while a user is engaged in some activity. Users wear the eyewear devices and can view a real-world environment through the eyewear devices while interacting with the virtual content that is displayed by the eyewear devices.

BRIEF DESCRIPTION OF THE DRAWINGS

Various ones of the appended drawings merely illustrate examples of the present disclosure and should not be considered as limiting its scope.

DETAILED DESCRIPTION

Figure 1:
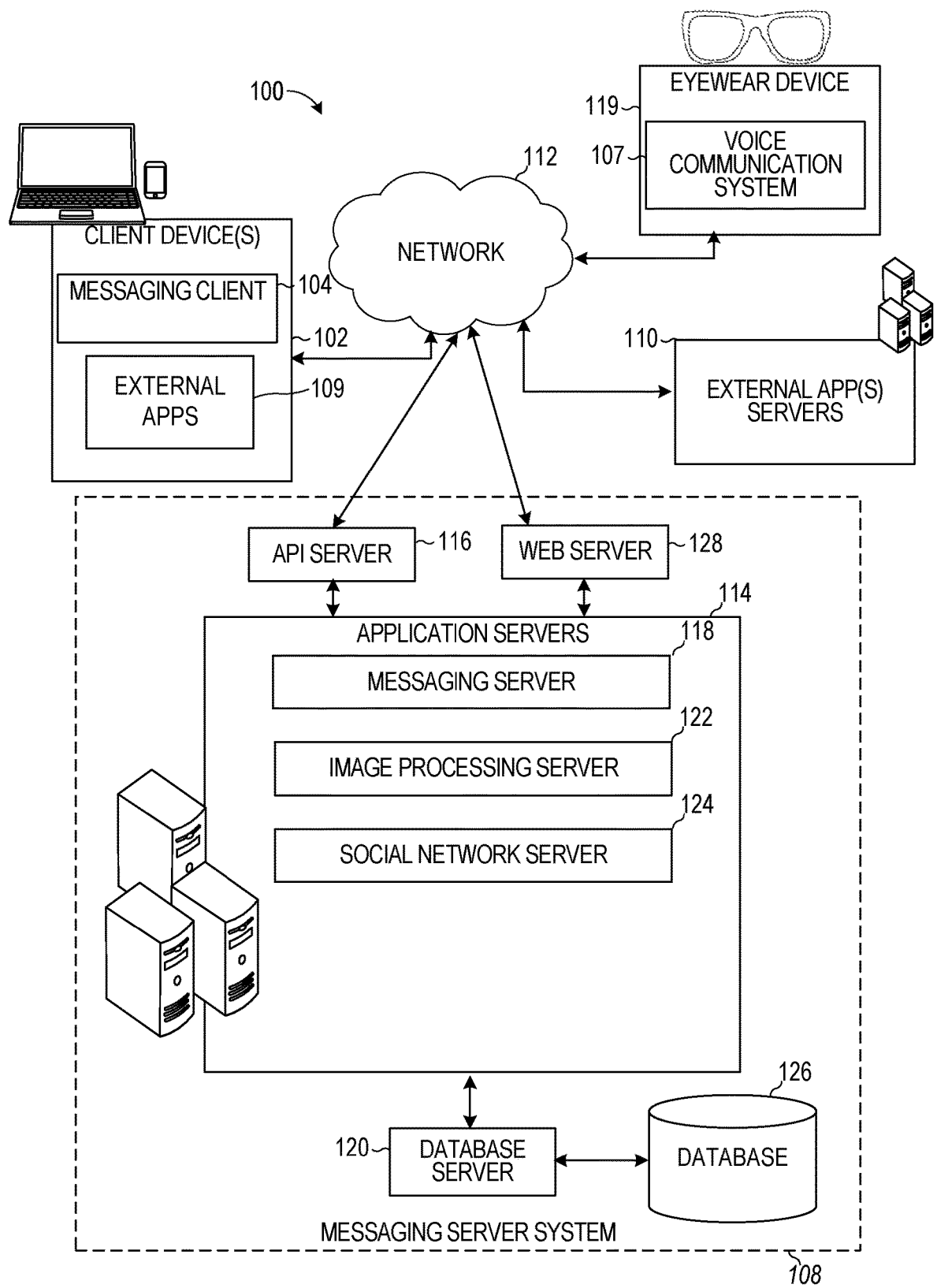
FIG. 1 is a diagrammatic representation of a networked environment in which the present disclosure may be deployed, in accordance with some examples.

The description that follows discusses illustrative examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

Typical smart glasses platforms allow users to interact with various types of virtual content. Such platforms are configured to display the virtual content in the lenses of the smart glasses over a real-world environment seen through the lenses of the smart glasses. Sometimes these smart glasses platforms allow users to interact with each other by sending text or audio messages, such as via a chat interface. The smart glasses platforms usually display the chat interface in a dedicated portion of the display and do not consider movement of the users about the real-world environment in the display of the chat interface. This can limit the ability for the users to interact with each other and can take away from the visual appeal and the illusion that the users are all conversing in the same real-world environment. Also, the smart glasses platforms are usually worn on the head of the users, which restricts the ability of the smart glasses platforms to detect body movement and facial expressions. This limits the type of information that the smart glasses platforms exchange with each other, which may reduce the interest users have in conducting communication sessions using such smart glasses platforms.

The disclosed examples improve the efficiency of using the electronic device by providing an AR system that allows users to engage in voice-based communications in a realistic way that incorporates participants of the voice-based communications within a real-world of the users. Specifically, the disclosed techniques establish, by a first AR device, a voice communication session between a plurality of users. The disclosed techniques establish display, by the first AR device of a first user of the plurality of users, an avatar representing a second user of the plurality of users. The disclosed techniques receive, by the first AR device of a first user of the plurality of users, input from the first user that selects a display position for the avatar representing the second user within a real-world environment of the first user. The disclosed techniques animate the avatar representing the second user based on movement information received from a second AR device of the second user.

In this way, the disclosed examples increase the efficiencies of the electronic device by reducing the amount of pages of information and inputs needed to accomplish a task. The disclosed examples further increase the efficiency, appeal, and utility of electronic AR devices, such as eyewear devices. While the disclosed examples are provided within a context of electronic eyewear devices, similar examples can be applied to any other type of AR wearable device.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications 109 using Applications Program Interfaces (APIs).

In some examples, the messaging system 100 includes an eyewear device 119, which hosts a voice communication system 107, among other applications. Any number of eyewear devices 119 can be included in the messaging system 100 although only one instance of the eyewear device 119 is shown.

The eyewear device 119 can represent any type of AR device that is worn by a user, such as AR glasses and/or an AR headset. The eyewear device 119 is communicatively coupled to the client device 102 via the network 112 (which may include via a dedicated short-range communication path, such as a Bluetooth™ or WiFi direct connection). In some cases, the eyewear device 119 includes all of the functionality that is in the client device 102 including the messaging client 104 and the external apps 109. In some examples, the client device 102 includes a messaging client 104 that implements a vision system. The vision system can include one or more machine learning models that have been trained based on training data to detect people or humans and body movement of the people or humans and facial expressions. Specifically, the vision system can capture one or more images that depict a person. The vision system can process the one or more images using the trained machine learning models to identify and segment one or more human objects from the images. The segmented human objects are then processed to identify three-dimensional (3D) positions of limbs and joints and to detect positioning of different facial features representing different facial expressions. The vision system of the client device 102 can provide movement information to the eyewear device 119 (e.g., the voice communication system 107 of the eyewear device 119) that includes the 3D positions of the limbs and joins and the positioning of the facial features.

The voice communication system 107 enables one or more users to communicate with each other through a voice-based communication session. Specifically, in some examples, the voice communication system 107 establishes, by a first AR device (e.g., a first eyewear device 119), a voice communication session between a plurality of users. The voice communication system 107 displays, by the first AR device of a first user of the plurality of users, an avatar representing a second user of the plurality of users and receives input from the first user that selects a display position for the avatar representing the second user within a real-world environment of the first user. The voice communication system 107 animates the avatar representing the second user based on movement information received from a second AR device of the second user.

In some examples, the voice communication system 107 displays a plurality of avatars including the avatar within the real-world environment, each of the plurality of avatars representing a respective user of the plurality of users. In some examples, the voice communication system 107 displays, by the first AR device, a graphical region over the real-world environment, wherein the avatar is displayed inside the graphical region. In some examples, the graphical region includes a square box or any other geometric shape (e.g., circle, hexagon, octagon, and so forth). In some cases, the geometric shape is selected based on a quantity of participants involved in the voice communication session.

In some examples, the voice communication system 107 receives, as the input, a request to anchor the avatar at the display position and detects movement of the first AR device to view a different portion of the real-world environment. The voice communication system 107 maintains the avatar displayed at the display position while the first AR device is moved to view the different portion of the real-world environment.

In some examples, the voice communication system 107 detects movement of the first AR device to view a different portion of the real-world environment and updates the display position of the avatar to keep the avatar displayed within view of the different portion of the real-world environment in response to detecting the movement of the first AR device. In some examples, the first AR device includes an AR eyewear device. In some examples, the voice communication system 107 receives a request from the second user to participate in the voice communication session with the first user.

In some examples, the second AR device (a second instance of the eyewear device 119) is configured to generate the movement information by accessing gyroscopic data to detect movement of a head of the second user. The second AR device can transmit an instruction to the first AR device to update an orientation of the avatar based on the movement of the head of the second user.

In some examples, the second AR device is configured to generate the movement information by accessing microphone data to detect speech input of the second user. The second AR device can transmit an instruction to the first AR device to update lips of the avatar based on the speech input of the second user. In some examples, the voice communication system 107 animates the avatar by determining that the movement information includes facial expression information and updating a facial expression of the avatar based on the facial expression information received from the second AR device.

In some examples, the second AR device accesses information from an external vision system (e.g., messaging client 104) to generate the facial expression information. In some examples, the voice communication system 107 animates the avatar by determining that the movement information includes body movement information and generating a whole body avatar as the avatar in response to determining that the movement information includes body movement information. In some examples, the voice communication system 107 updates one or more body parts of the avatar based on the body movement information received from the second AR device.

In some examples, the second AR device includes an AR eyewear device, and the external vision system of the messaging client 104 is coupled to the AR eyewear device. In some examples, the messaging application is configured to apply one or more machine learning models to one or more images depicting the second user that have been captured by the mobile device to generate the body movement information. In some examples, the voice communication system 107 selects between a first type of avatar including only a head of a person and a second type of avatar including a whole body of a person based on determining whether an external vision system is coupled to the second AR device of the second user.

A messaging client 104 is able to communicate and exchange data with other messaging clients 104, the eyewear device 119, and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Image processing server 122 is used to implement scan functionality of the augmentation system 208. Scan functionality includes activating and providing one or more AR experiences on a client device 102 when an image is captured by the client device 102. Specifically, the messaging client 104 on the client device 102 can be used to activate a camera. The camera displays one or more real-time images or a video to a user along with one or more icons or identifiers of one or more AR experiences. The user can select a given one of the identifiers to launch the corresponding augmented reality experience. Launching the AR experience includes obtaining one or more augmented reality items associated with the AR experience and overlaying the augmented reality items on top of the images or video being presented.

Figure 3:
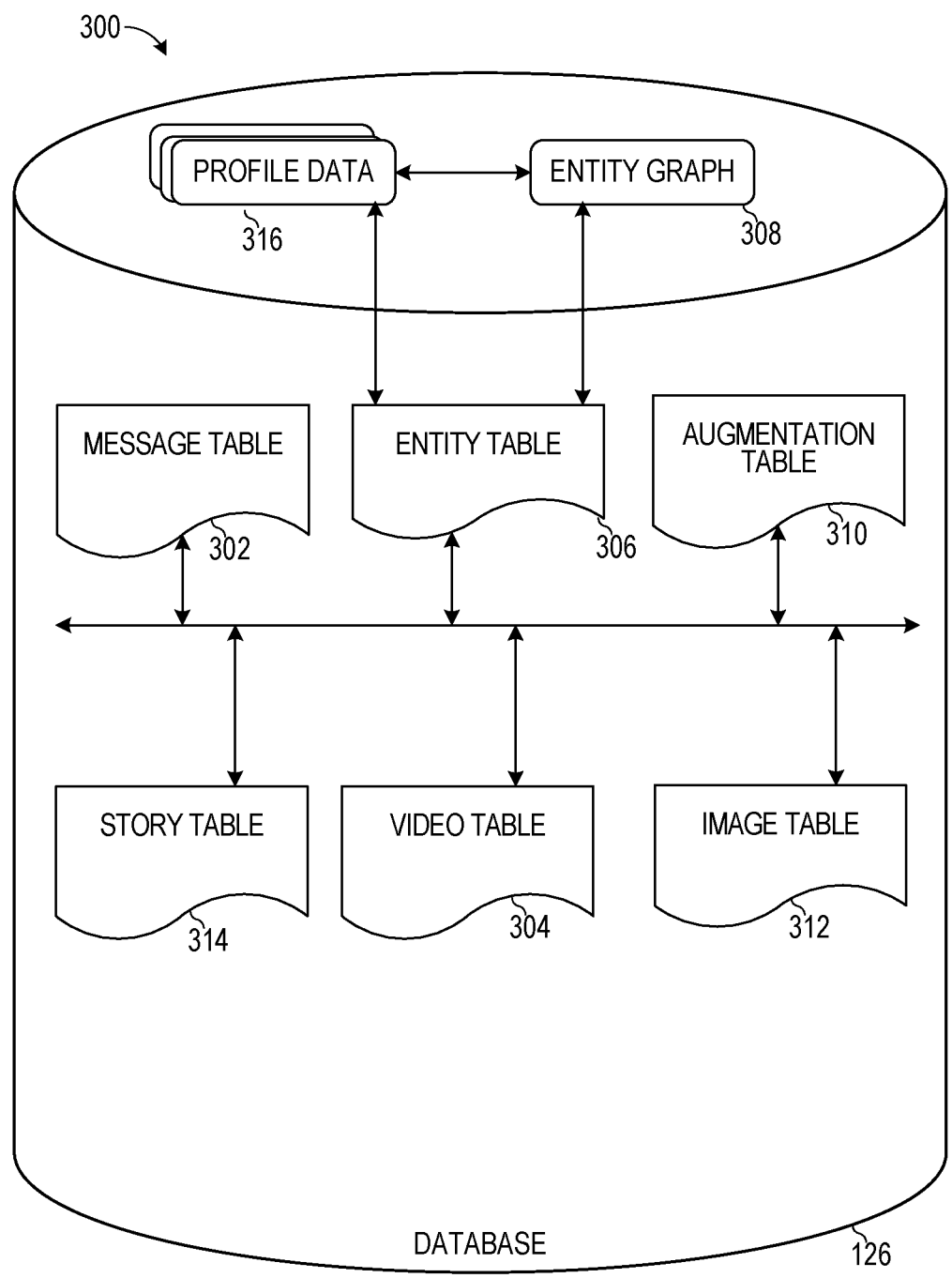
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

System Architecture

Figure 2:
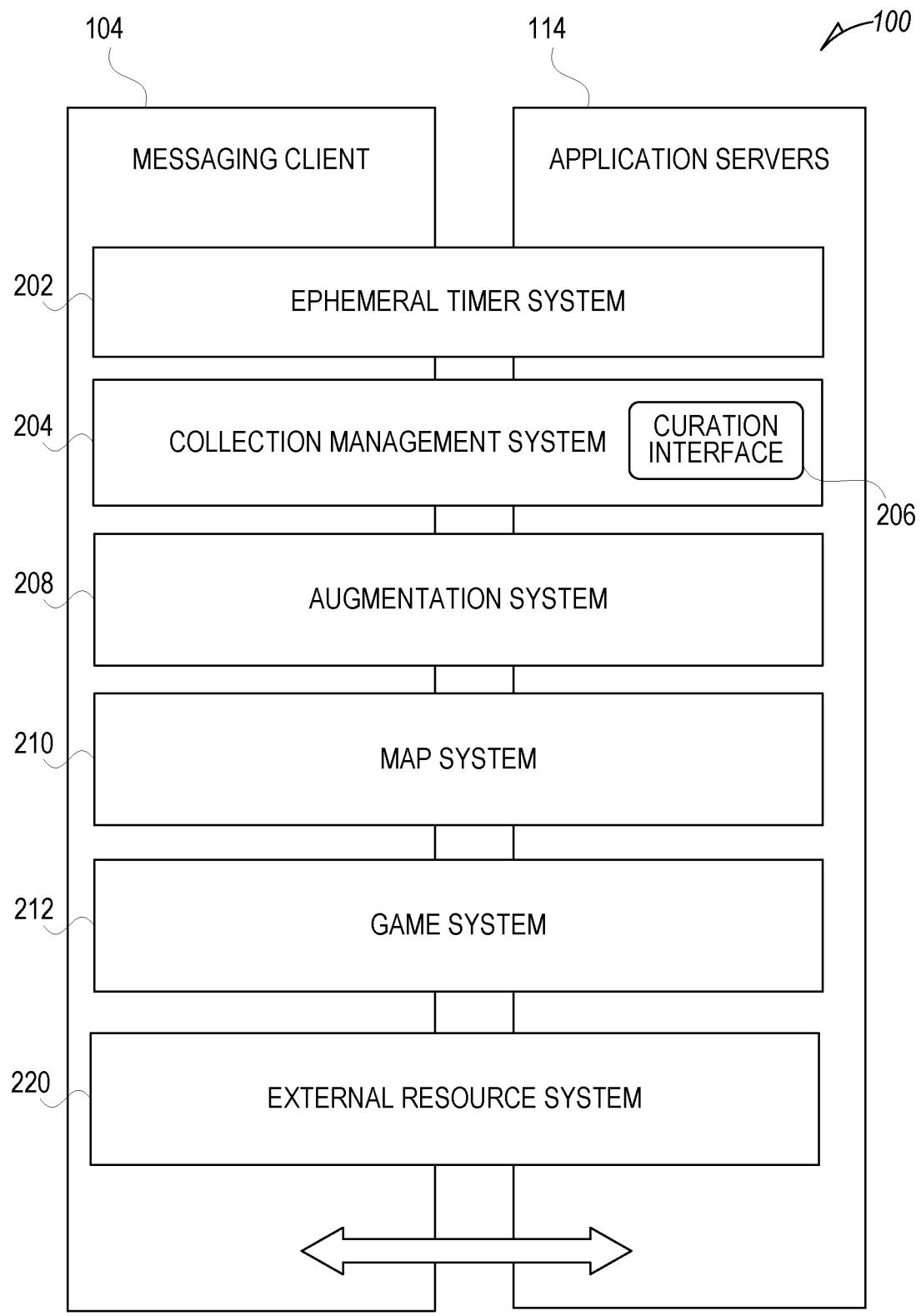
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a Web ViewJavaScript-Bridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
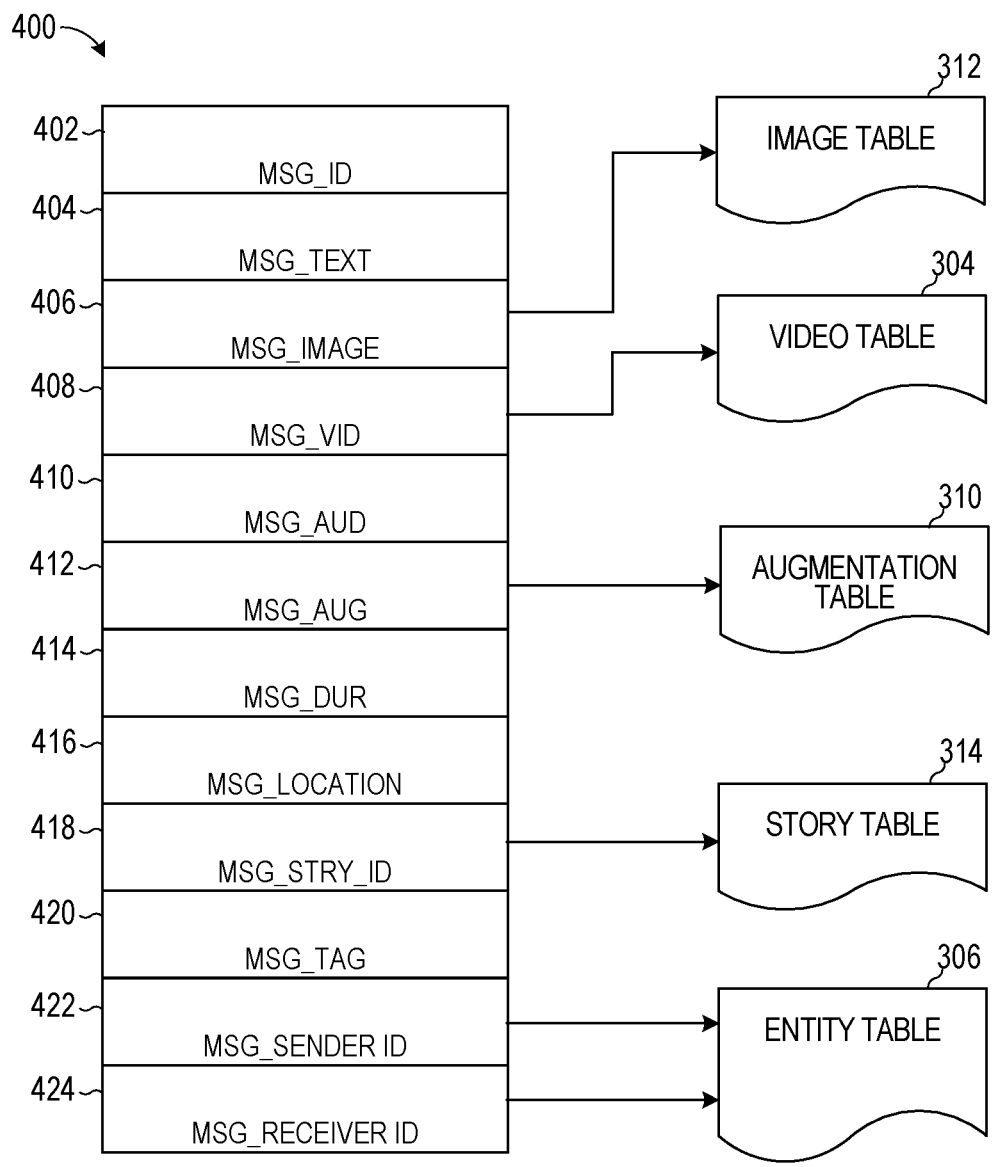
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400;

message text payload 404: text, to be generated by a user via a user interface of the client device 102, and that is included in the message 400;

message image payload 406: image data, captured by a camera component of a client device 102 or retrieved from a memory component of a client device 102, and that is included in the message 400. Image data for a sent or received message 400 may be stored in the image table 312;

message video payload 408: video data, captured by a camera component or retrieved from a memory component of the client device 102, and that is included in the message 400. Video data for a sent or received message 400 may be stored in the video table 304;

message audio payload 410: audio data, captured by a microphone or retrieved from a memory component of the client device 102, and that is included in the message 400;

message augmentation data 412: augmentation data (e.g., filters, stickers, or other annotations or enhancements)

that represents augmentations to be applied to message image payload 406, message video payload 408, or message audio payload 410 of the message 400. Augmentation data for a sent or received message 400 may be stored in the augmentation table 310;

message duration parameter 414: parameter value indicating, in seconds, the amount of time for which content of the message (e.g., the message image payload 406, message video payload 408, message audio payload 410) is to be presented or made accessible to a user via the messaging client 104;

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408);

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values;

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition;

message sender identifier 422: an identifier (e.g., a messaging system identifier, email address, or device identifier) indicative of a user of the client device 102 on which the message 400 was generated and from which the message 400 was sent; and message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Eyewear Device

Figure 5:
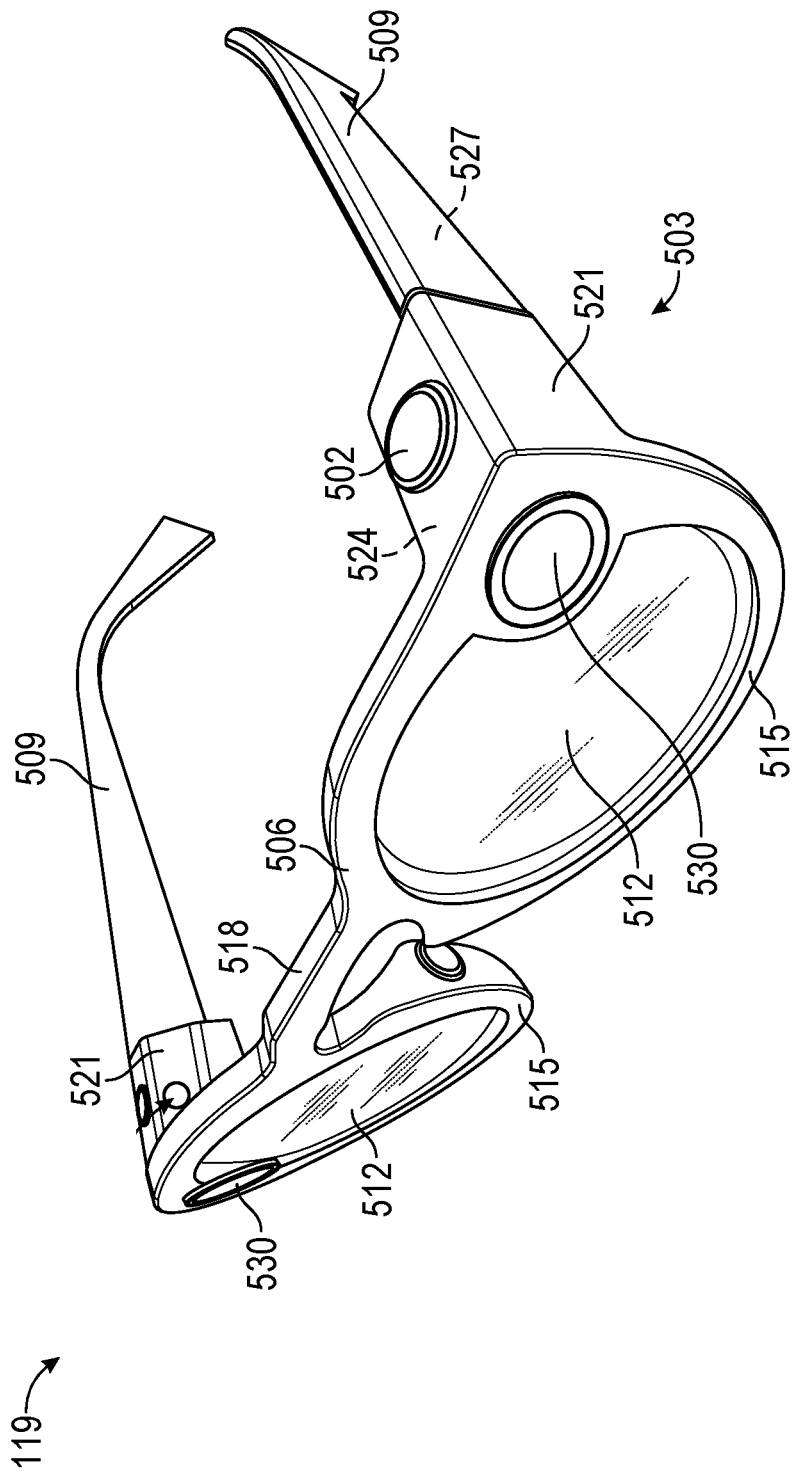
FIG. 5 is a perspective view of an eyewear device, according to some examples.

FIG. 5 shows a front perspective view of an eyewear device 119 in the form of a pair of smart glasses that include a voice communication system 107 according to some examples. The eyewear device 119 includes a body 503 comprising a front piece or frame 506 and a pair of temples 509 connected to the frame 506 for supporting the frame 506 in position on a user's face when the eyewear device 119 is worn. The frame 506 can be made from any suitable material such as plastics or metal, including any suitable shape memory alloy. The frame 506 can include a touch input interface that is configured to receive touch input from a user (e.g., one finger touch, two finger touch, or combination thereof together with dragging the finger(s) along the frame 506, such as lateral end pieces 521).

The eyewear device 119 includes a pair of optical elements in the form of a pair of lenses 512 held by corresponding optical element holders in the form of a pair of rims 515 forming part of the frame 506. The rims 515 are connected by a bridge 518. In other examples, one or both of the optical elements can be a display, a display assembly, or a lens and display combination.

The frame 506 includes a pair of end pieces 521 defining lateral end portions of the frame 506. In this example, a variety of electronics components are housed in one or both of the end pieces 521. The temples 509 are coupled to the respective end pieces 521. In this example, the temples 509 are coupled to the frame 506 by respective hinges so as to be hingedly movable between a wearable mode and a collapsed mode in which the temples 509 are pivoted towards the frame 506 to lie substantially flat against it. In other examples, the temples 509 can be coupled to the frame 506 by any suitable means, or can be rigidly or fixedly secured to the frame 506 so as to be integral therewith.

Each of the temples 509 includes a front portion that is coupled to the frame 506 and any suitable rear portion for coupling to the ear of the user, such as the curves illustrated in the example of FIG. 5. In some examples, the frame 506 is formed of a single piece of material, so as to have a unitary or monolithic construction. In some examples, the whole of the body 503 (including both the frame 506 and the temples 509) can be of the unitary or monolithic construction.

The eyewear device 119 has onboard electronics components including a computing device, such as a computer 524, or low power processor, which can in different examples be of any suitable type so as to be carried by the body 503. In some examples, the computer 524 is at least partially housed in one or both of the temples 509. In the present example, various components of the computer 524 are housed in the lateral end pieces 521 of the frame 506. The computer 524 includes one or more processors with memory (e.g., a volatile storage device, such as random access memory or registers), a storage device (e.g., a non-volatile storage device), wireless communication circuitry (e.g., BLE communication devices and/or WiFi direct devices), and a power source. The computer 524 comprises low-power circuitry, high-speed circuitry, and, in some examples, a display processor. Various examples may include these elements in different configurations or integrated together in different ways.

The computer 524 additionally includes a battery 527 or other suitable portable power supply. In one example, the battery 527 is disposed in one of the temples 509. In the eyewear device 119 shown in FIG. 5, the battery 527 is shown as being disposed in one of the end pieces 521, being electrically coupled to the remainder of the computer 524 housed in the corresponding end piece 521.

The eyewear device 119 is camera-enabled, in this example comprising a camera 530 mounted in one of the end pieces 521 and facing forwards so as to be aligned more or less with the direction of view of a wearer of the eyewear device 119. The camera 530 is configured to capture digital images (also referred to herein as digital photographs or pictures) as well as digital video content. Operation of the camera 530 is controlled by a camera controller provided by the computer 524, image data representative of images or video captured by the camera 530 being temporarily stored on a memory forming part of the computer 524. In some examples, the eyewear device 119 can have a pair of cameras 530, e.g., housed by the respective end pieces 521.

The onboard computer 524 and the lenses 512 are configured together to provide a voice communication system 107 that presents avatars of one or more users engaged in a voice-based communication session and animates the avatars based on movement information associated with each respective user. Specifically, the lenses 512 can display virtual content, such as an AR objects including the avatars of the users engaged in the voice-based communication session together with one or more real-world objects of a real-world environment. This makes it appear to the user that the virtual content is integrated within the real-world environment that the user views through the lenses 512. In some examples, the virtual content is received from the client device 102. In some examples, the virtual content is received directly from the application servers 114. The onboard computer 524 receives input from the user that drags or moves the avatars into a particular display position. The input can indicate whether the display position is anchored to a particular real-world object. In such cases, as the lenses 512 are moved to view a different portion of the real-world environment, the avatars remain fixed in display positions to the particular real-world object and can be removed from view if the lenses 512 are turned or moved a sufficient distance away from the display position of the avatars. In some examples, the display position is not anchored, in which cases as the lenses 512 are moved to view different portions of the real-world environment, the avatar display positions are also updated to remain within view. This allows the user to move about their surroundings and consistently and continuously see the avatars of the users with whom the user is engaged in a voice-based conversation.

The eyewear device 119 includes an accelerometer and/or gyroscope and a touch interface and a voice command system. Based on input received by the eyewear device 119 from the accelerometer and a touch interface and the voice command system, the eyewear device 119 can control user interaction with the virtual content. The accelerometer and/or gyroscope can be used to determine movement and an orientation of a head of a wearer to generate movement information for an avatar of the wearer that is included and displayed in a voice-based communication session with another user.

The eyewear device 119 can include communication device(s) to communicate with a client device 102. Based on such communications with the client device 102, the eyewear device 119 can determine a real-world position of the client device 102 and physical movement of the client device 102. The eyewear device 119 can receive movement information captured by the client device 102 indicating movement of facial features of the user of the eyewear device 119 and/or body parts of the user. Specifically, the client device 102 can capture one or more images of the user who is wearing the eyewear device 119 and can process the images with one or more machine learning models to generate the movement information. The movement information can represent head movement, facial feature movement, and/or body movements. The movement information can be provided to the eyewear device 119 for transmission to one or more other users involved in the voice-based communication session. Such movement information can then be used by the recipient eyewear device 119 to update an avatar presented as part of the voice-based communication session.

The eyewear device 119 further includes one or more communication devices, such as Bluetooth low energy (BLE) communication interface. Such BLE communication interface enables the eyewear device 119 to communicate wirelessly with the client device 102. Other forms of wireless communication can also be employed instead of, or in addition to, the BLE communication interface, such as a WiFi direct interface. The BLE communication interface implements a standard number of BLE communication protocols.

A first of the communications protocols implemented by the BLE interface of the eyewear device 119 enables an unencrypted link to be established between the eyewear device 119 and the client device 102. In this first protocol, the link-layer communication (the physical interface or medium) between the eyewear device 119 and the client device 102 includes unencrypted data. In this first protocol, the application layer (the communication layer operating on the physically exchanged data) encrypts and decrypts data that is physically exchanged in unencrypted form over the link layer of the BLE communication interface. In this way, data exchanged over the physical layer can freely be read by an eavesdropping device, but the eavesdropping device will not be able to decipher the data that is exchanged without performing a decryption operation in the application layer.

A second of the communications protocols implemented by the BLE interface of the eyewear device 119 enables an encrypted link to be established between the eyewear device 119 and the client device 102. In this second protocol, the link-layer communication (the physical interface) between the eyewear device 119 and the client device 102 receives data from the application layer and adds a first type of encryption to the data before exchanging the data over the physical medium. In this second protocol, the application layer (the communication layer operating on the physically exchanged data) may or may not use a second type of encryption to encrypt and decrypt data that is physically exchanged in encrypted form, using the first type of encryption, over the link layer of the BLE communication interface. Namely, data can be first encrypted by the application layer and then can be further encrypted by the physical layer before being exchanged over the physical medium. Following the exchange over the physical medium, the data is then decrypted by the physical layer and then decrypted again (e.g., using a different type of encryption) by the application layer. In this way, data exchanged over the physical layer cannot be read by an eavesdropping device as the data is encrypted in the physical medium.

In some examples, the client device 102 communicates with the eyewear device 119 using the first protocol to exchange images or videos or virtual content between the messaging client 104 and the eyewear device 119.

Voice Communication System

Figure 6:
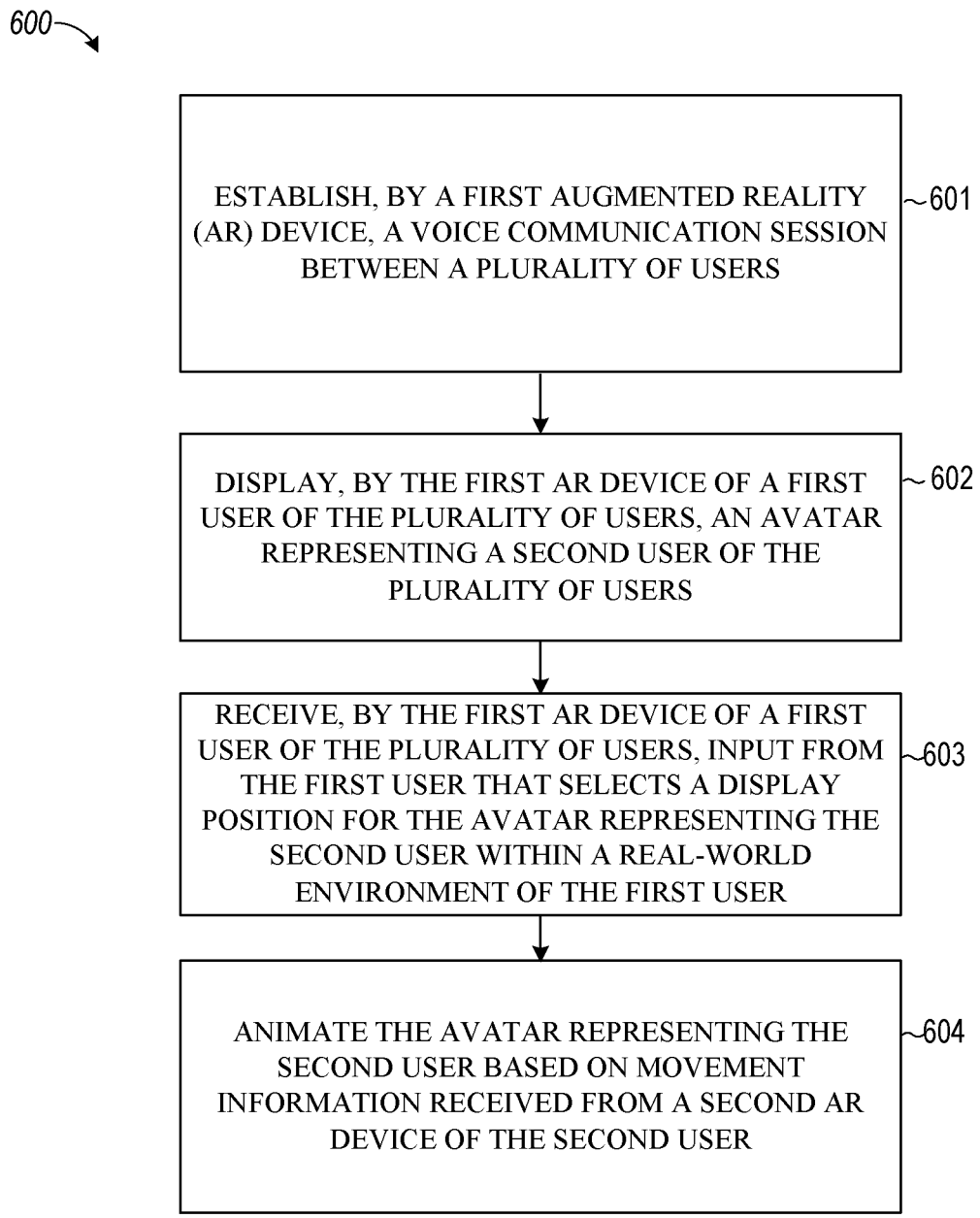
FIG. 6 is a flowchart showing example operations of the AR voice communication system, according to some examples.

FIG. 6 is a flowchart illustrating example operations of the voice communication system 107 in performing a process 600, according to some examples. The process 600 may be embodied in computer-readable instructions for execution by one or more processors such that the operations of the process 600 may be performed in part or in whole by the functional components of the voice communication system 107; accordingly, the process 600 is described below by way of example with reference thereto. However, in other examples, at least some of the operations of the process 600 may be deployed on various other hardware configurations.

The process 600 is therefore not intended to be limited to the voice communication system 107 and can be implemented in whole, or in part, by any other component. Some or all of the operations of process 600 can be in parallel, out of order, or entirely omitted.

At operation 601, the voice communication system 107 establishes, by a first AR device, a voice communication session between a plurality of users.

At operation 602, the voice communication system 107 displays, by the first AR device of a first user of the plurality of users, an avatar representing a second user of the plurality of users.

At operation 603, the voice communication system 107 receives, by the first AR device of a first user of the plurality of users, input from the first user that selects a display position for the avatar representing the second user within a real-world environment of the first user.

At operation 604, the voice communication system 107 animates the avatar representing the second user based on movement information received from a second AR device of the second user.

Figure 7:
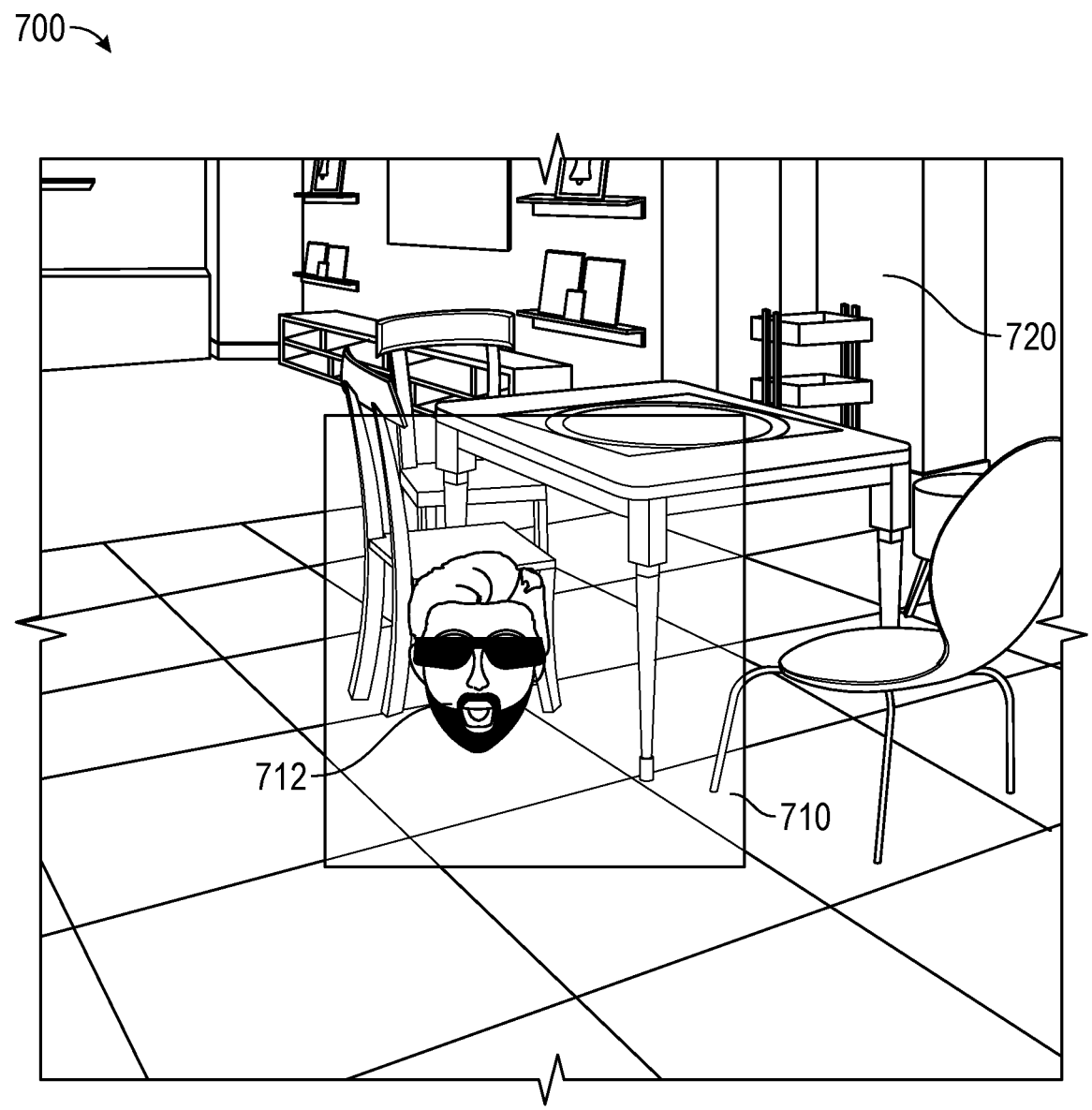
FIGS. 7-9 are illustrative screens of a graphical user interface for the AR voice communication system, according to some examples.
Figure 8:
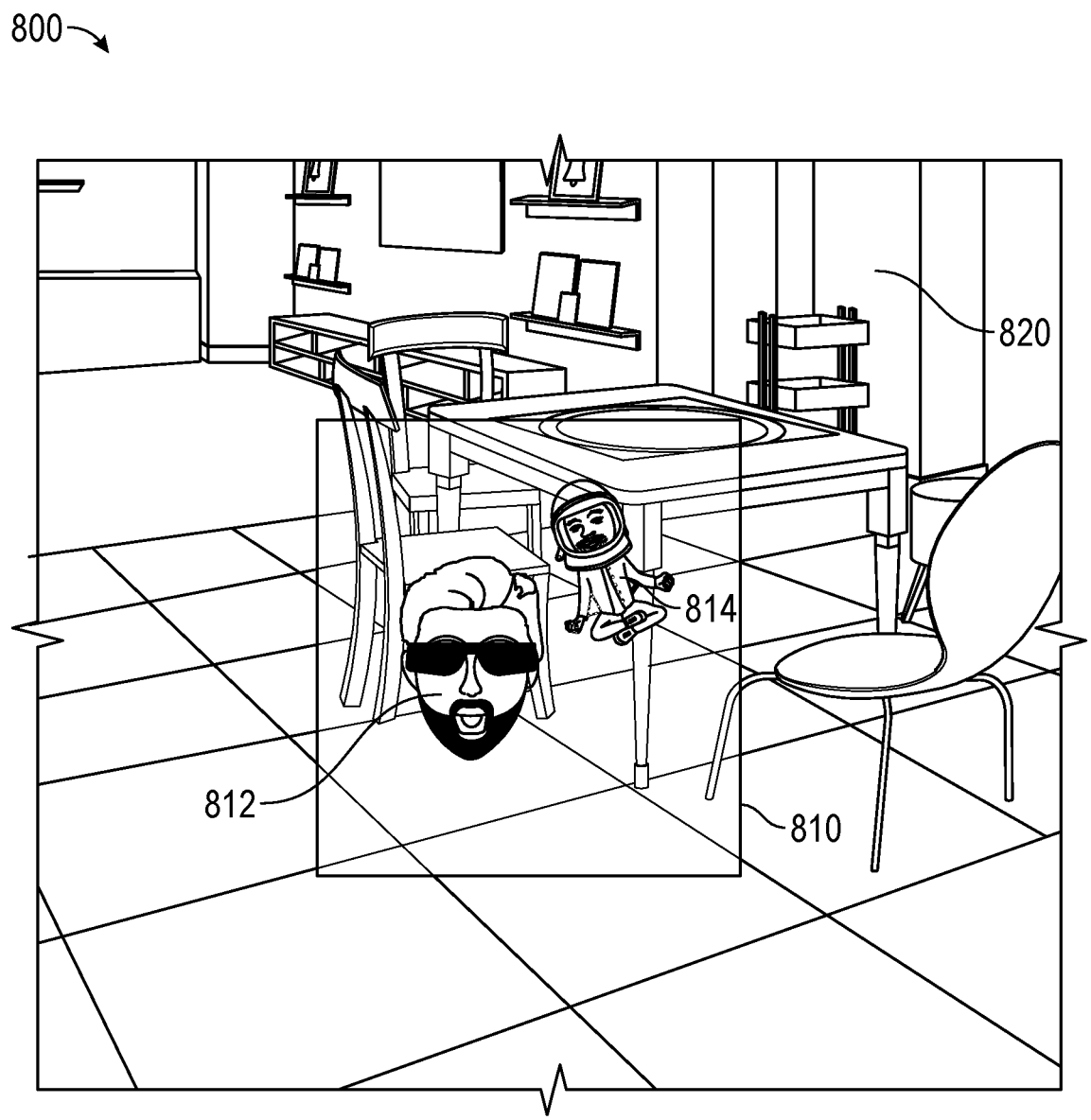
Figure 9:
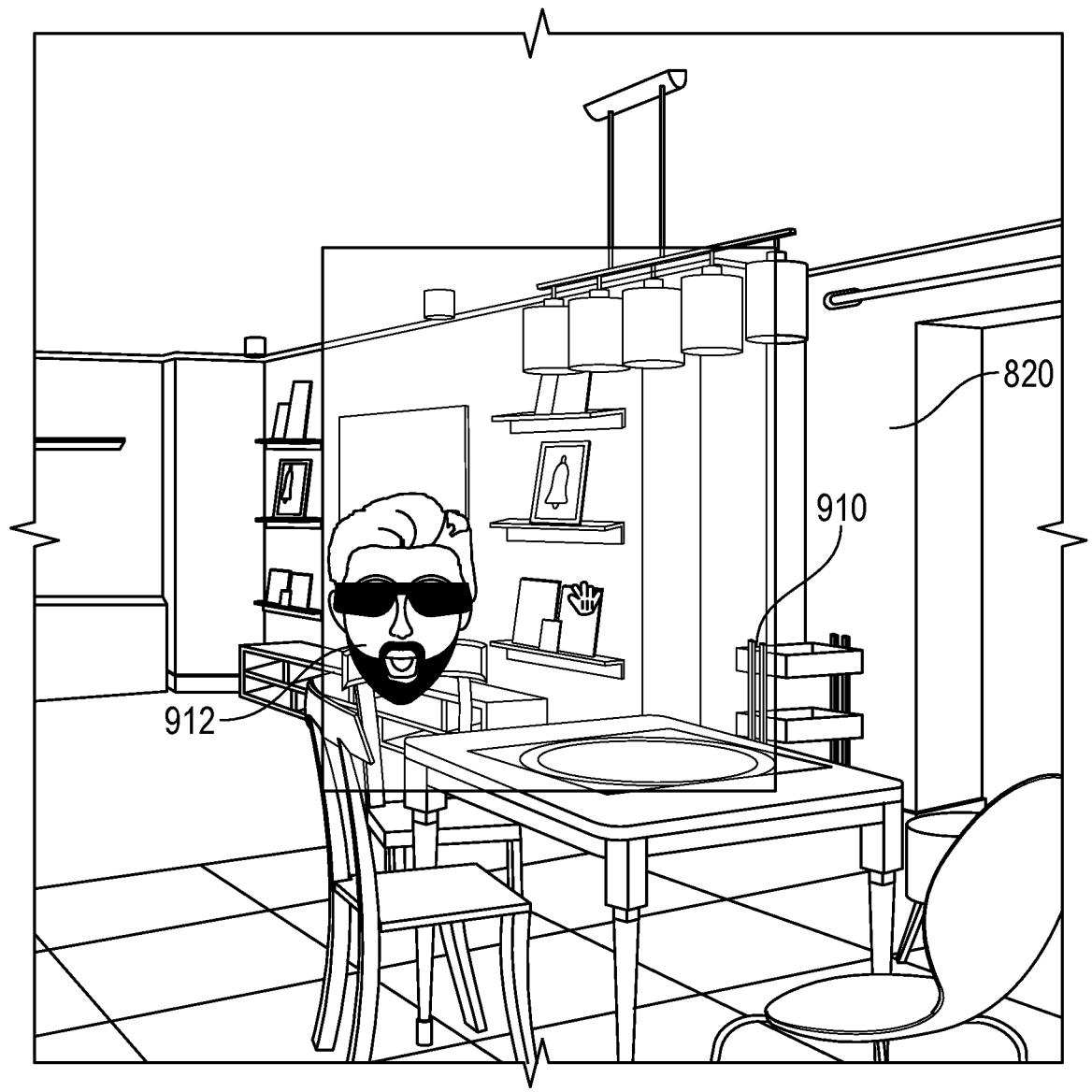

FIGS. 7-9 are illustrative screens of a graphical user interface of the voice communication system 107 according to some examples. The screens shown in FIGS. 7-9 may be provided by the messaging client 104 of one or more client devices 102, other applications implemented on one or more client devices 102, and/or the eyewear device 119.

FIG. 7 shows a user interface 700 of the voice communication system 107. The user interface 700 includes a real-world environment 720 that a first user sees through the lenses of a first eyewear device 119. The first eyewear device 119 can receive a request from the first user to establish a voice-based communication session (e.g., a phone call) with one or more other users including a second user. The second user may have a second eyewear device 119 that receives the request from the first eyewear device 119 of the first user. In response to the second eyewear device 119 receiving the request, the second eyewear device 119 presents a notification to the second user informing the second user about the request received from the first eyewear device 119.

The second eyewear device 119 can receive input from the second user (directly on the second eyewear device 119 or indirectly from the client device 102 of the second user). In response, the second eyewear device 119 confirms the establishment of the voice-based communication session with the first eyewear device 119. The first and second eyewear devices 119 begin exchanging audio information including verbal inputs received from their respective users via respective microphones of the eyewear device 119 and/or the client device 102. For example, the first eyewear device 119 can capture audio input including verbal input from a microphone of the first eyewear device 119 and can transmit that audio input to the second eyewear device 119. The second eyewear device 119 presents the received audio input to the second user via one or more speakers of the second eyewear device 119 and/or speakers of a client device 102 coupled to the second eyewear device 119.

Similarly, the second eyewear device 119 can capture audio input including verbal input from a microphone of the second eyewear device 119 and can transmit that audio input to the first eyewear device 119. The first eyewear device 119 presents the received audio input to the first user via one or more speakers of the first eyewear device 119 and/or speakers of a client device 102 coupled to the first eyewear device 119.

In some examples, the first eyewear device 119 can receive and/or access an avatar associated with the second user. The avatar can include only a head portion. The avatar can include a whole body in some cases. In some examples, the first eyewear device 119 can present an AR region 710 (e.g., a square or circular or other geometric shape) that represents participants of the voice-based communication session. The AR region 710 can be presented as an overlay on top of the real-world environment 720 that is viewed through the lenses of the first eyewear device 119. The AR region 710 can include one or more avatars 712 that correspond to participants of the voice-based communication session. For example, the one or more avatars 712 can include the avatar received and/or accessed from the second eyewear device 119.

In some examples, the first eyewear device 119 can receive input from the first user (directly via touch sensors of the first eyewear device 119 and/or via the client device 102 coupled to the first eyewear device 119). The input can designate a display position for the AR region 710. For example, the input can drag the AR region 710 to a particular portion of the screen, such as the upper right corner or the center of the screen shown in the lenses of the first eyewear device 119. Any one or more avatars 712 presented in the AR region 710 can be moved to the designated display position. In some cases, the input can specify that the designated display position is an anchored position. In such circumstances, the AR region 710 is not updated or moved around as the first eyewear device 119 moves to view a different portion of the real-world environment. For example, if the user turns their head 180 degrees to see what is behind the user, the AR region 710 remains in the previous portion of the real-world environment and is removed from view. An indicator can be presented to the user that identifies the display position of the AR region 710 to re-orient the user and inform the user how to physically move around to re-view the AR region 710. In some cases, the indicator can be selected by the user via interaction with the first eyewear device 119, and in response, the AR region 710 is unanchored and the display position of the AR region 710 is updated to be displayed within the current view of the real-world environment.

In some examples, the first eyewear device 119 receives movement information from the second eyewear device 119. The movement information can include movement of facial features or expressions and/or movement of body parts of the second user. For example, the second eyewear device 119 can access movement information from an on-board accelerometer and/or gyroscope. Based on the movement information, the second eyewear device 119 can determine a current orientation or change in orientation of the second eyewear device 119. The second eyewear device 119 can use the current orientation or change in orientation of the second eyewear device 119 to update the orientation of a head of the avatar of the second user. The second eyewear device 119 sends this current orientation or change in orientation to the first eyewear device 119, which then updates the orientation of the one or more avatars 712 that are included in the AR region 710. For example, if the second user tilts their head to the right while they are speaking, the second eyewear device 119 can send this right tilt information to the first eyewear device 119. The first eyewear device 119 can, together with presenting the audio representing the speech input of the second user, animate the one or more avatars 712 to tilt the heads to the right by the same amount and degree indicated by the current orientation or change in orientation information received from the second eyewear device 119.

As another example, the second eyewear device 119 can access movement information from an external vision system, such as a messaging client 104 implemented by a client device 102 coupled to the second eyewear device 119. Specifically, the external vision system can capture one or more images of the second user who is wearing the second eyewear device 119. The external vision system applies the one or more images to a trained machine learning model to determine and extract a face depicted in the images. The machine learning model can also provide the current positions of the facial elements (e.g., a current position and orientation of eyes, nose, eyebrows, lips, mouth and/or ears) as facial movement information.

Based on the facial movement information, the second eyewear device 119 can update the facial features of the avatar of the second user. The second eyewear device 119 sends these updates to the facial features of the avatar to the first eyewear device 119 which then updates the facial features of the one or more avatars 712 that are included in the AR region 710. For example, if the second user frowns or smiles (which changes the positioning and/or orientation of facial elements) while they are speaking, the second eyewear device 119 can send this positioning and/or orientation of facial elements information to the first eyewear device 119. The first eyewear device 119 can, together with presenting the audio representing the speech input of the second user, animate the one or more avatars 712 to depict their facial features as frowning or smiling. For example, as shown in the user interface 800 of FIG. 8, a facial feature or expression of the second avatar 812 of the second user is updated relative to the facial feature or expression of the second avatar 712 shown in FIG. 7. The second avatar 812 can be presented in an AR region 810 over a real-world environment 820.

As another example, the first eyewear device 119 can add a third user as a participant to the voice-based communication or conversation session in which the first and second users are engaged. The first eyewear device 119 can receive an avatar 814 of the third user via a third eyewear device 119 associated with the third user. In some cases, the third eyewear device 119 can access movement information from an external vision system, such as a messaging client 104 implemented by a client device 102 coupled to the third eyewear device 119. Specifically, the external vision system can capture one or more images of the third user who is wearing the third eyewear device 119. The external vision system applies the one or more images to a trained machine learning model to determine and extract a whole body of the third user depicted in the images. The machine learning model can also provide the current positions of limbs and joins of the whole body of the third user (e.g., position of arms, torso, legs, head, shoulders, and so forth) as whole body movement information.

Based on the whole body movement information, the third eyewear device 119 can update the avatar of the third user to be a whole body avatar. Namely, rather than sending just a head portion of the avatar, if the third eyewear device 119 receives whole body movement information, the third eyewear device 119 generates a whole body avatar that resembles a pose (positioning of the limbs and joints) of the third user depicted in the image captured by the client device 102. The third eyewear device 119 sends the whole body avatar to the first eyewear device 119 and the second eyewear device 119 and any other eyewear device 119 that is involved in the voice-based communication session. The first and second eyewear devices 119 then display a whole body version of the avatar 814 as part of the one or more avatars 712 that are included in the AR region 810. In such cases, if the third user raises their arms while they are speaking, the third eyewear device 119 can send this positioning and/or orientation of whole body movement information to the first eyewear device 119 and the second eyewear device 119. The first eyewear device 119 and the second eyewear device 119 can, together with presenting the audio representing the speech input of the third user, animate the whole body of the avatar 814 to depict the avatar 814 as raising the arms of the avatar 814.

In some examples, the first eyewear device 119 detects movement of the first eyewear device 119 from viewing a first portion of the real-world environment 720 to viewing a second portion of the real-world environment 820. In response to detecting the movement, the first eyewear device 119 moves the AR region 910 in which the avatars 912 of the users involved in the voice-based conversation session are displayed, as shown in FIG. 9. The first eyewear device 119 moves the AR region 910 along the direction in which the first eyewear device 119 was moved so as to maintain the AR region 910 in a fixed display position in view of the lenses of the first eyewear device 119 regardless of what portion of the real-world environment 820 is being viewed through the lenses of the first eyewear device 119.

For example, if the first eyewear device 119 is moved up by the user turning their head to point towards the ceiling, the first eyewear device 119 moves the AR region 910 up to keep the AR region 910 centered within the current view of the real-world environment 820. In some examples, the first eyewear device 119 animates the AR region 910 as moving up in response to the first eyewear device 119 moving in the upwards direction. Initially, the first eyewear device 119 moves the AR region 910 independent of the avatar 912 that is presented in the AR region 910. Namely, the avatar 912 can remain in a fixed position or moved to the opposite direction than the direction in which the AR region 910 is moved. Then, when the first eyewear device 119 no longer moves and remains stationary pointing towards a particular region of the real-world environment 820, the first eyewear device 119 bounces or animates the avatar 912 towards the center of the AR region 910 or the placement within the AR region 910 in which the avatar 912 was previously displayed before the first eyewear device 119 was moved.

Machine Architecture

Figure 10:
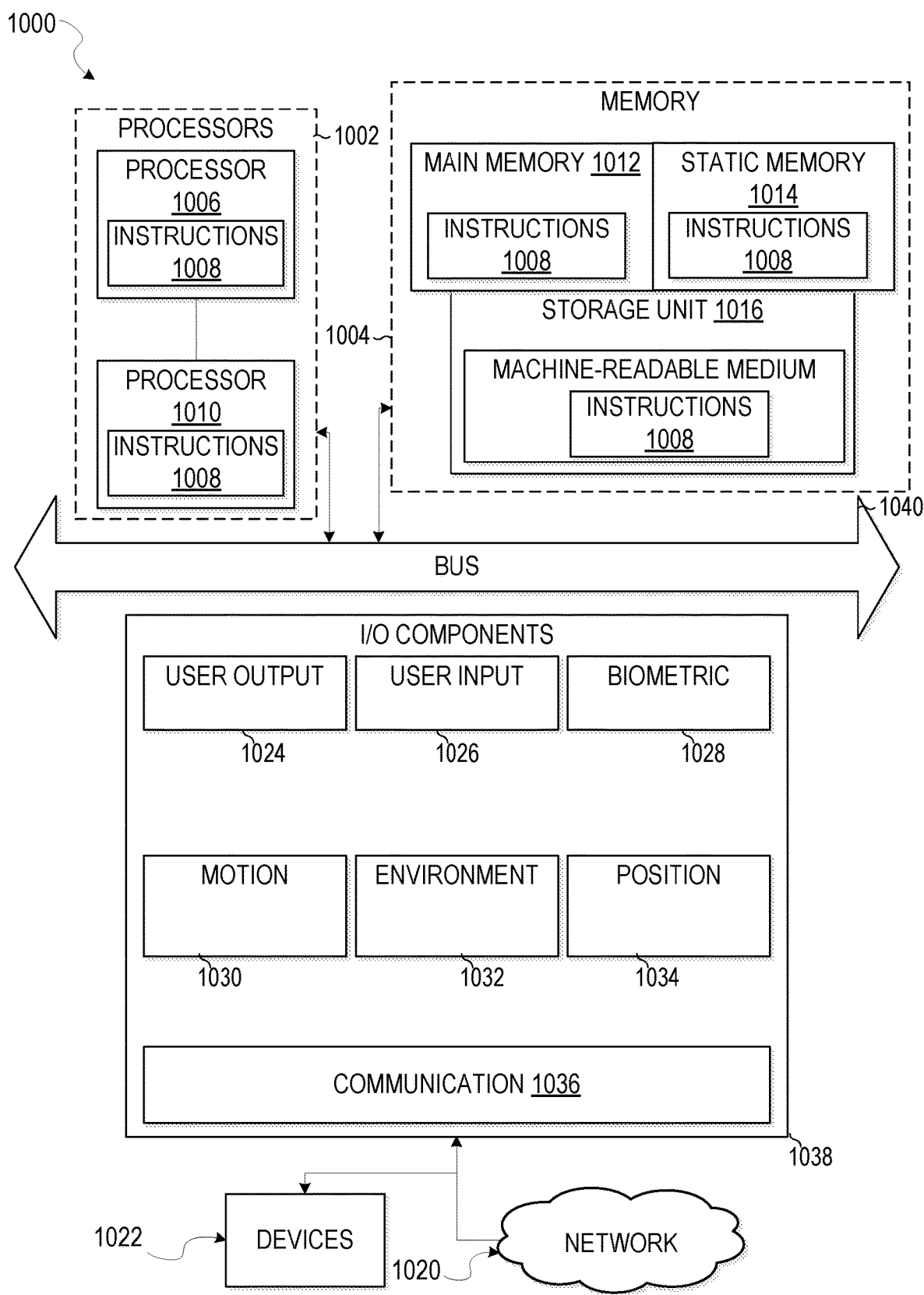
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of a machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output (I/O) components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, all accessible to the processors 1002 via the bus 1040. The main memory 1004, the static memory 1014, and the storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., hypertext transfer protocol (HTTP)). Similarly, the instructions 1008 may be transmitted or received using a transmission medium via a coupling (e.g., a peer-to-peer coupling) to the devices 1022.

Software Architecture

Figure 11:
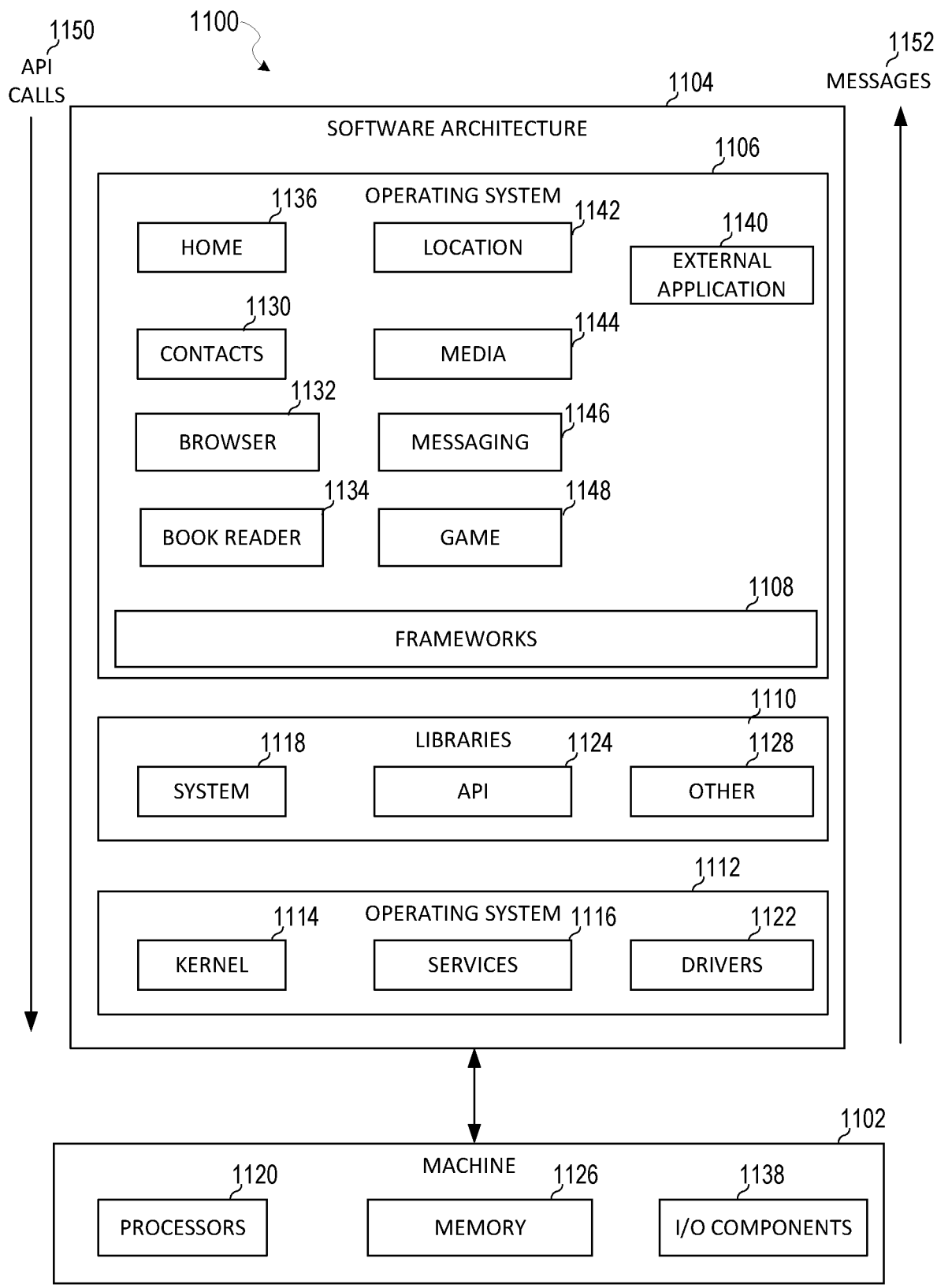
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as an external application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the external application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1140 can invoke the API calls 1150 provided by the operating system 1112 to facilitate functionality described herein.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code,", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed examples without departing from the scope of the present disclosure. These and other changes or modifications are intended to be included within the scope of the present disclosure, as expressed in the following claims.

Modules, Components, and Logic

Certain examples are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various examples, one or more computer systems (e.g., a standalone computer system, a client computer system, or a server computer system) or one or more hardware modules of a computer system (e.g., a processor or group of processors) is configured by software (e.g., an application or application portion) as a hardware module that operates to perform certain operations as described herein.

In some examples, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application-Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering examples in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In examples in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some examples, the processors or processor-implemented modules are located in a single geographic location (e.g., within a home environment, an office environment, or a server farm). In other examples, the processors or processor-implemented modules are distributed across a number of geographic locations.

What is claimed is:

1. A method comprising:
   establishing, by one or more processors of a first augmented reality (AR) device, a voice communication session between a plurality of users including a first user of the first AR device;
   displaying, by the first AR device, an avatar representing a second user of the plurality of users;
   receiving, by the first AR device, input from the first user that drags the avatar, representing the second user within a real-world environment of the first user, from a first display position to a second display position;
   displaying, by the first AR device, a graphical region over the real-world environment, wherein the avatar is displayed inside the graphical region; and
   animating the avatar representing the second user at the second display position based on movement information received from a second AR device of the second user.

2. The method of claim 1, further comprising:
   displaying a plurality of avatars including the avatar over the real-world environment, each of the plurality of avatars representing a respective user of the plurality of users, the plurality of avatars being displayed in the graphical region over the real-world environment;
   receiving data indicating that the graphical region has been dragged from the first display position to the second display position; and
   moving the plurality of avatars in the graphical region from the first display position to the second display position in response to receiving the data indicating that the graphical region has been dragged from the first display position to the second display position.

3. The method of claim 1, wherein the avatar is displayed in a first portion of the real-world environment, further comprising:
   detecting that the first AR device has been moved to view a second portion of the real-world environment that is different from the first portion of the real-world environment;
   determining that the first AR device is no longer moving and has remained stationary pointing towards the second portion of the real-world environment; and
   in response to determining that the first AR device is no longer moving and has remained stationary pointing towards the second portion of the real-world environment, moving the avatar to a new display position.

4. The method of claim 1, further comprising:
   receiving, as the input, a request to anchor the avatar at the display position;
   detecting movement of the first AR device to view a different portion of the real-world environment; and
   maintaining the avatar displayed at the display position while the first AR device is moved to view the different portion of the real-world environment.

5. The method of claim 1, further comprising:
   detecting movement of the first AR device to view a different portion of the real-world environment; and
   updating a display position of the avatar to keep the avatar displayed within view of the different portion of the real-world environment in response to detecting the movement of the first AR device.

6. The method of claim 1, further comprising:
   maintaining the graphical region within view of the first AR device as the first AR device moves to view different portions of the real-world environment.

7. The method of claim 6, further comprising:
   animating the graphical region as moving in a same direction as the first AR device is being moved to view the different portions of the real-world environment, the graphical region being moved in the same direction as the first AR device while the avatar remains in a fixed position within the graphical region.

8. The method of claim 7, wherein the avatar is moved in an opposite direction from the same direction in which the graphical region is being moved to keep the avatar in the fixed position within the graphical region, wherein the second AR device is configured to generate the movement information by:
    accessing gyroscopic data to detect movement of a head of the second user, wherein the second AR device transmits an instruction to the first AR device to update an orientation of the avatar based on the movement of the head of the second user.

9. The method of claim 7, further comprising:
    determining that the first AR device is no longer moving and has remained stationary pointing towards the different portions of the real-world environment; and
    in response to determining that the first AR device is no longer moving and has remained stationary pointing towards the different portions of the real-world environment, moving the avatar to towards a center of the graphical region from the fixed position in which the avatar has remained while the first AR device was being moved.

10. The method of claim 1, wherein the second AR device is configured to generate the movement information by:
    accessing microphone data to detect speech input of the second user, wherein the second AR device transmits an instruction to the first AR device to update lips of the avatar based on the speech input of the second user.

11. The method of claim 1, wherein animating the avatar comprises:
    determining that the movement information includes facial expression information; and
    updating a facial expression of the avatar based on the facial expression information received from the second AR device.

12. The method of claim 1, wherein animating the avatar comprises:
    determining that the movement information includes body movement information; and
    generating a whole body avatar as the avatar in response to determining that the movement information includes body movement information.

13. The method of claim 12, further comprising:
    updating one or more body parts of the avatar based on the body movement information received from the second AR device.

14. The method of claim 12, wherein the second AR device accesses information from an external vision system to generate the body movement information.

15. The method of claim 14, wherein the second AR device comprises an AR eyewear device, and wherein the external vision system comprises a messaging application implemented by a mobile device coupled to the AR eyewear device.

16. The method of claim 15, wherein the messaging application is configured to apply one or more machine learning models to one or more images depicting the second user that have been captured by the mobile device to generate the body movement information.

17. The method of claim 1, wherein displaying the avatar comprises:
    selecting between a first type of avatar comprising only a head of a person and a second type of avatar comprising a whole body of a person based on determining whether an external vision system is coupled to the second AR device of the second user.

18. A system comprising:
    a storage device of an eyewear device; and
    at least one processor configured to perform operations comprising:
    establishing, by a first augmented reality (AR) device, a voice communication session between a plurality of users;
    displaying, by the first AR device, an avatar representing a second user of the plurality of users;
    receiving, by the first AR device, input from the first user that drags the avatar, representing the second user within a real-world environment of the first user, from a first display position to a second display position;
    displaying, by the first AR device, a graphical region over the real-world environment, wherein the avatar is displayed inside the graphical region; and
    animating the avatar representing the second user at the second display position based on movement information received from a second AR device of the second user.

19. A non-transitory machine-readable storage medium comprising instructions that, when executed by one or more processors of a machine, cause the machine to perform operations comprising:
    establishing, by a first augmented reality (AR) device, a voice communication session between a plurality of users;
    displaying, by the first AR device, an avatar representing a second user of the plurality of users;
    receiving, by the first AR device, input from the first user that drags the avatar, representing the second user within a real-world environment of the first user, from a first display position to a second display position;
    displaying, by the first AR device, a graphical region over the real-world environment, wherein the avatar is displayed inside the graphical region; and
    animating the avatar representing the second user at the second display position based on movement information received from a second AR device of the second user.

* * * * *

UNITED STATES PATENT AND TRADEMARK OFFICE
CERTIFICATE OF CORRECTION

PATENT NO. : 12,236,512 B2  
APPLICATION NO. : 17/893696  
DATED : February 25, 2025  
INVENTOR(S) : Tran et al.

Page 1 of 1

It is certified that error appears in the above-identified patent and that said Letters Patent is hereby corrected as shown below:

On the Title Page

On page 6, in Column 2, under "Other Publications", Line 1, delete "malled" and insert --mailed-- therefor On page 6, in Column 2, under "Other Publications", Line 3, delete "malled" and insert --mailed-- therefor On page 6, in Column 2, under "Other Publications", Line 5, delete "malled" and insert --mailed-- therefor On page 6, in Column 2, under "Other Publications", Line 51, delete "malled" and insert --mailed-- therefor On page 7, in Column 1, under "Other Publications", Line 15, delete "malled" and insert --mailed-- therefor On page 7, in Column 1, under "Other Publications", Line 52, delete "malled" and insert --mailed-- therefor Signed and Sealed this  
Twentieth Day of January, 2026

John A. Squires  
*Director of the United States Patent and Trademark Office*